US009646460B2

(12) United States Patent

Zurawski et al.

(10) Patent No.: US 9,646,460 B2

(45) Date of Patent: May 9, 2017

(54) GAMING SYSTEM AND METHOD PROVIDING A SLOT GAME INCLUDING A SYMBOL REPLACEMENT FEATURE

(71) Applicant: IGT, Las Vegas, NV (US)

(72) Inventors: Troy Zurawski, Phoenix, AZ (US); Brant Frazee, Scottsdale, AZ (US)

(73) Assignee: IGT, Las Vegas, NV (US)

( * ) Notice: Subject to any disclaimer, the term of this patent is extended or adjusted under 35 U.S.C. 154(b) by 327 days.

(21) Appl. No.: 14/285,154

(22) Filed: May 22, 2014

(65) Prior Publication Data

US 2015/0339880 A1 Nov. 26, 2015

(51) Int. Cl.

*G06F 17/00* (2006.01)
*G07F 17/32* (2006.01)
*G07F 17/34* (2006.01)

(52) U.S. Cl.

CPC .......... *G07F 17/3244* (2013.01); *G07F 17/32* (2013.01); *G07F 17/34* (2013.01)

(58) Field of Classification Search

CPC ..... G07F 17/32; G07F 17/326; G07F 17/3286
USPC ...................................................... 463/16–20
See application file for complete search history.

(56) References Cited

U.S. PATENT DOCUMENTS

| | | |
|---|---|---|
| 5,431,408 A | 7/1995 | Adams et al. |
| 5,722,891 A | 3/1998 | Inoue |
| 5,947,820 A | 9/1999 | Morro et al. |
| 6,120,031 A | 9/2000 | Adams et al. |
| 6,322,078 B1 | 11/2001 | Adams |
| 6,334,814 B1 | 1/2002 | Adams |
| 6,346,043 B1 | 2/2002 | Colin et al. |
| 6,375,570 B1 | 4/2002 | Poole |
| 6,413,162 B1 | 7/2002 | Baerlocher et al. |
| 6,464,581 B1 | 10/2002 | Yoseloff et al. |
| 6,464,582 B1 | 10/2002 | Baerlocher et al. |
| 6,554,703 B1 | 4/2003 | Bussick et al. |
| 6,561,900 B1 | 5/2003 | Baerlocher et al. |
| 6,565,433 B1 | 5/2003 | Baerlocher et al. |
| 6,604,740 B1 | 8/2003 | Singer et al. |
| 6,634,945 B2 | 10/2003 | Glavich et al. |
| 6,669,559 B1 | 12/2003 | Baerlocher et al. |
| 6,672,960 B1 | 1/2004 | B-Jensen |

(Continued)

*Primary Examiner* — Michael Cuff

(74) *Attorney, Agent, or Firm* — Neal, Gerber & Eisenberg LLP

(57) ABSTRACT

Various embodiments of the present disclosure provide a gaming system and method providing a slot game including a symbol replacement feature. Generally, in various embodiments, the slot game employs a plurality of different symbols, each of which is included in one of a plurality of different groups. Each group includes at least two different symbols. In operation, the gaming system displays a plurality of the symbols and, if a triggering event associated with one of the groups occurs, the gaming system provides the symbol replacement feature by replacing at least one displayed symbol of that group with a different one of the symbols of that group. Thus, when providing the symbol replacement feature in these embodiments, the gaming system of the present disclosure replaces certain displayed symbols included in a particular group with different symbols included in that particular group and not with any symbols included in any other groups.

20 Claims, 13 Drawing Sheets

(56) References Cited

U.S. PATENT DOCUMENTS

| | | | |
|---|---|---|---|
| 6,731,313 B1 | 5/2004 | Kaminkow | |
| 6,746,328 B2 | 6/2004 | Cannon et al. | |
| 6,749,502 B2 | 6/2004 | Baerlocher | |
| 6,769,716 B2 | 8/2004 | Rouhana et al. | |
| 6,780,109 B2 | 8/2004 | Kaminkow | |
| 6,805,349 B2 | 10/2004 | Baerlocher et al. | |
| 6,840,858 B2 | 1/2005 | Adams | |
| 6,855,053 B2 | 2/2005 | Baerlocher | |
| 6,855,054 B2 | 2/2005 | White et al. | |
| 6,866,583 B2 | 3/2005 | Glavich et al. | |
| 6,905,405 B2 | 6/2005 | McClintic | |
| 6,905,406 B2 | 6/2005 | Kaminkow et al. | |
| 6,910,962 B2 | 6/2005 | Marks et al. | |
| 6,921,335 B2 | 7/2005 | Rodgers et al. | |
| 6,939,223 B1 | 9/2005 | Jones | |
| 6,939,229 B2 | 9/2005 | McClintic | |
| 6,960,133 B1 | 11/2005 | Marks et al. | |
| 6,964,416 B2 | 11/2005 | McClintic et al. | |
| 6,981,635 B1 | 1/2006 | Hughs-Baird et al. | |
| 6,988,947 B2 | 1/2006 | Baerlocher et al. | |
| 7,040,983 B2 | 5/2006 | Dolloff et al. | |
| 7,056,192 B2 | 6/2006 | Venigalla et al. | |
| 7,056,213 B2 | 6/2006 | Ching et al. | |
| 7,070,502 B1 | 7/2006 | Bussick et al. | |
| 7,074,127 B2 | 7/2006 | Cuddy et al. | |
| 7,090,580 B2 | 8/2006 | Rodgers et al. | |
| 7,094,148 B2 | 8/2006 | Baerlocher et al. | |
| 7,128,646 B2 | 10/2006 | Baerlocher et al. | |
| 7,169,042 B2 | 1/2007 | Muir et al. | |
| 7,229,350 B2 | 6/2007 | Baerlocher et al. | |
| 7,252,591 B2 | 8/2007 | Van Asdale | |
| 7,371,168 B2 | 5/2008 | Bilyeu et al. | |
| 7,396,279 B2 | 7/2008 | Berman et al. | |
| 7,399,226 B2 | 7/2008 | Mishra | |
| 7,402,102 B2 | 7/2008 | Marks et al. | |
| 7,513,826 B2 | 4/2009 | Cuddy | |
| 7,553,231 B2 | 6/2009 | Rodgers et al. | |
| 7,585,219 B2 | 9/2009 | Randall et al. | |
| 7,591,724 B2 | 9/2009 | Baerlocher | |
| 7,611,406 B2 | 11/2009 | Fuller | |
| 7,666,085 B2 | 2/2010 | Vorias et al. | |
| 7,695,363 B2 | 4/2010 | Gilliland et al. | |
| 7,699,699 B2 | 4/2010 | Gilliland et al. | |
| 7,740,536 B2 | 6/2010 | Pederson et al. | |
| 7,753,773 B2 | 7/2010 | Baerlocher et al. | |
| 7,794,320 B2 | 9/2010 | Baerlocher et al. | |
| 7,874,908 B2 | 1/2011 | Walker et al. | |
| 7,914,376 B2 | 3/2011 | Walker et al. | |
| 7,950,994 B2 | 5/2011 | Berman et al. | |
| 8,002,625 B2 | 8/2011 | Maya | |
| 8,021,226 B2 | 9/2011 | Souza et al. | |
| 8,043,155 B2 | 10/2011 | Singer et al. | |
| 8,062,119 B2 | 11/2011 | Stern et al. | |
| 8,096,877 B2 | 1/2012 | Hoffman | |
| 8,105,151 B2 | 1/2012 | Caputo et al. | |
| 8,137,179 B2 | 3/2012 | Jensen et al. | |
| 8,162,741 B2 | 4/2012 | Wadleigh et al. | |
| 8,172,665 B2 | 5/2012 | Hoffman et al. | |
| 8,221,206 B2 | 7/2012 | Marks et al. | |
| 8,226,468 B2 | 7/2012 | Hoffman et al. | |
| 8,277,302 B2 | 10/2012 | Walker et al. | |
| 8,287,357 B2 | 10/2012 | Evans | |
| 8,323,091 B2 | 12/2012 | Frank et al. | |
| 8,366,538 B1 | 2/2013 | Saunders et al. | |
| 8,444,144 B2 | 5/2013 | Walker et al. | |
| 8,444,473 B2 | 5/2013 | Ching et al. | |
| 8,475,259 B2 | 7/2013 | Weber | |
| 8,512,138 B2 | 8/2013 | Saunders | |
| 2002/0025843 A1 † | 2/2002 | Bryant | |
| 2005/0054418 A1 | 3/2005 | Baerlocher | |
| 2005/0059478 A1 | 3/2005 | Peterson et al. | |
| 2005/0148384 A1 | 7/2005 | Marks et al. | |
| 2006/0030392 A1 | 2/2006 | Rodgers et al. | |
| 2009/0124347 A1 | 5/2009 | Rodgers et al. | |
| 2009/0227338 A1 † | 9/2009 | Yoshizawa | |
| 2010/0029364 A1 | 2/2010 | Zielinski | |
| 2010/0120507 A1 | 5/2010 | Rodgers et al. | |
| 2010/0124972 A1 | 5/2010 | Rodgers et al. | |
| 2010/0234089 A1 | 9/2010 | Saffari et al. | |
| 2011/0111825 A1 | 5/2011 | Caputo | |
| 2011/0124405 A1 * | 5/2011 | Okada | G07D 7/002 463/25 |
| 2012/0172106 A1 | 7/2012 | Caputo et al. | |
| 2013/0053122 A1 | 2/2013 | Spark-Stahl et al. | |
| 2013/0079098 A1 | 3/2013 | Nicely et al. | |
| 2013/0184046 A1 | 7/2013 | Vermaak et al. | |
| 2013/0190066 A1 | 7/2013 | Saunders | |
| 2013/0217463 A1 | 8/2013 | Hughes et al. | |
| 2015/0080088 A1 * | 3/2015 | Smalley | G07F 17/34 463/20 |

* cited by examiner
† cited by third party

GAMING SYSTEM AND METHOD PROVIDING A SLOT GAME INCLUDING A SYMBOL REPLACEMENT FEATURE

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in larger awards being provided when they do occur.

For such known gaming systems, an amount of a wager placed on a primary game by a player may vary. For instance, a gaming system may enable a player to wager a minimum quantity of credits, such as one credit (e.g., in monetary currency, one penny, nickel, dime, quarter, or dollar; in non-monetary currency, one point, credit, coin, token, free play credit, or virtual buck), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming system may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Various players continually seek out new and different variations to gaming systems. A continuing need thus exists for gaming systems and methods that provide new, exciting, and engaging games.

SUMMARY

Various embodiments of the present disclosure provide a gaming system and method providing a slot game including a symbol replacement feature. Generally, in various embodiments, the slot game employs a plurality of different symbols, each of which is included in one of a plurality of different groups. Each group includes at least two different symbols. In operation of these embodiments, the gaming system displays a plurality of the symbols and, if a triggering event associated with one of the groups occurs, the gaming system provides the symbol replacement feature by replacing at least one displayed symbol of that group with a different one of the symbols of that group. Thus, when providing the symbol replacement feature in these embodiments, the gaming system of the present disclosure replaces certain displayed symbols included in a particular group with different symbols included in that particular group and not with any symbols included in any other groups.

More specifically, in operation of one embodiment, for a play of the slot game, the gaming system displays a plurality of symbol display areas. For each of the plurality of symbol display areas, the gaming system randomly determines one of a set of a plurality of different symbols and displays that randomly determined symbol at that symbol display area, such as by displaying a plurality of reels spinning and stopping in association with the symbol display areas. In this embodiment, for each symbol of the set of symbols, that symbol is included in one of a plurality of different groups of the symbols. Additionally, in this embodiment, each group of the symbols includes at least two different symbols of the set of symbols. If a triggering event associated with one of the groups of the symbols occurs, for each of at least one displayed symbol in that group of the symbols, the gaming system replaces that displayed symbol with a different one of the symbols in that group of the symbols. The gaming system determines any awards associated with the displayed symbols, and displays any determined awards.

In one embodiment, a first one of the groups of the symbols includes a first symbol having a first value and a second symbol having a second value that is lower than the first value. In this embodiment, if a first triggering event associated with the first one of the groups occurs and at least one of the second symbols is displayed, for each displayed second symbol, the gaming system replaces that displayed second symbol with the first symbol having the higher first value. Thus, in this embodiment, the gaming system employs the symbol replacement feature to replace relatively low-value displayed symbols of a particular group with relatively high-value displayed symbols of that same particular group.

It should thus be appreciated that the gaming system and method of the present disclosure provide a new game to increase player engagement, enjoyment, entertainment, and excitement.

Additional features and advantages are described herein, and will be apparent from, the following Detailed Description and the Figures.

DETAILED DESCRIPTION

Slot Game Including a Symbol Replacement Feature

Various embodiments of the present disclosure provide a gaming system and method providing a slot game including a symbol replacement feature. Generally, in various embodiments, the slot game employs a plurality of different symbols, each of which is included in one of a plurality of different groups. Each group includes at least two different symbols. In operation of these embodiments, the gaming system displays a plurality of the symbols and, if a triggering event associated with one of the groups occurs, the gaming system provides the symbol replacement feature by replacing at least one displayed symbol of that group with a different one of the symbols of that group. Thus, when providing the symbol replacement feature in these embodiments, the gaming system of the present disclosure replaces certain displayed symbols included in a particular group with different symbols included in that particular group and not with any symbols included in any other groups.

Although the slot game is described as a primary wagering game in the embodiments described herein, it should be appreciated that the slot game of the present disclosure may additionally or alternatively be implemented as a bonus or secondary game. Further, while any credit balances, any wagers, and any awards are displayed as amounts of monetary currency or credits, one or more of such credit balances, such wagers, and such awards may be for any suitable non-monetary credits or currency, such as promotional credits and/or player tracking points or credits.

Figure 1:
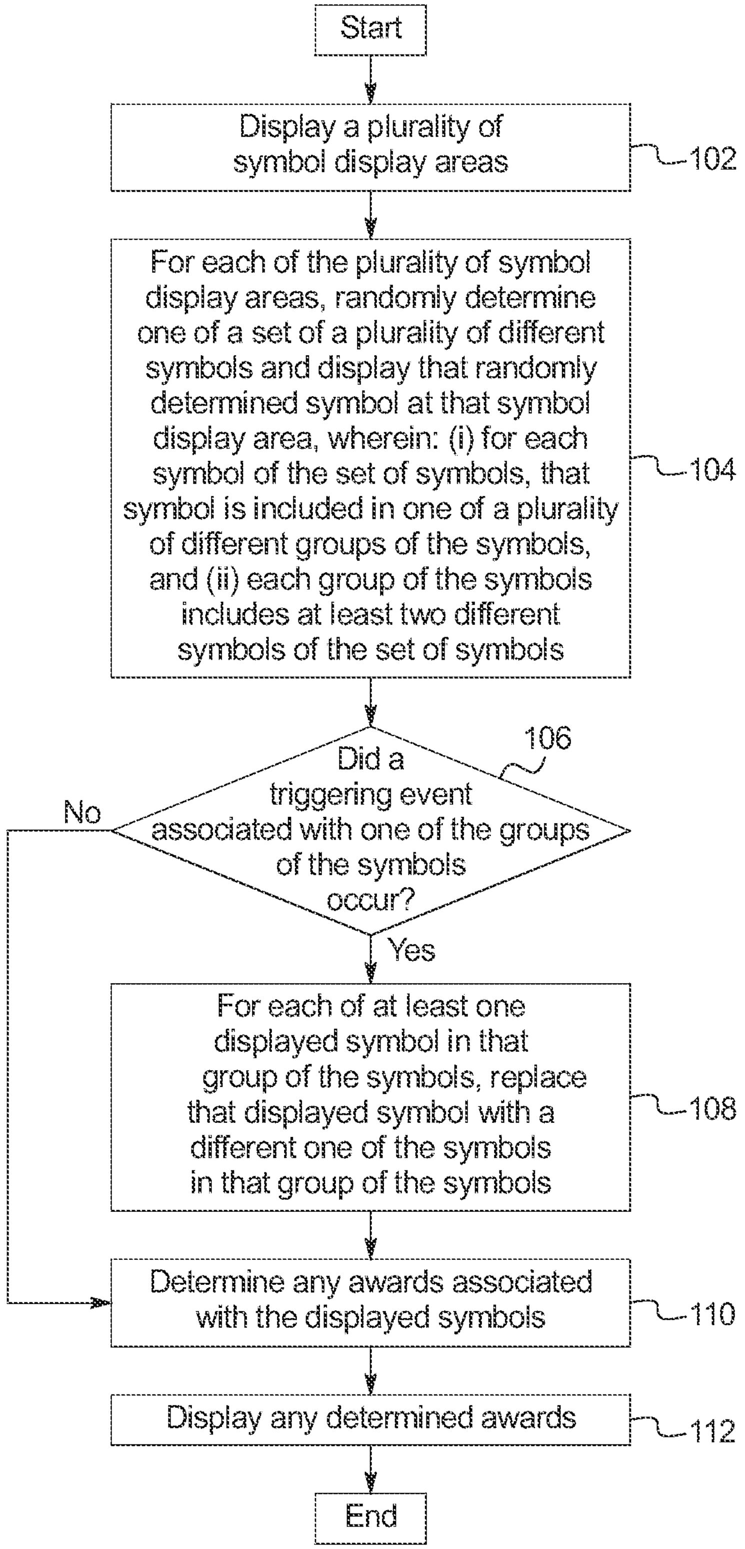
FIG. 1 is a flowchart illustrating an example method of operating one embodiment of the gaming system of the present disclosure.

FIG. 1 illustrates a flowchart of an example process or method 100 of operating one embodiment of the gaming system of the present disclosure. In various embodiments, the process 100 is represented by a set of instructions stored in one or more memories and executed by one or more processors. Although the process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the process 100 begins upon initiation of a play of the slot game including the symbol replacement feature. The gaming system displays a plurality of symbol display areas, as indicated by block 102. For each of the plurality of symbol display areas, the gaming system randomly determines one of a set of a plurality of different symbols and displays that randomly determined symbol at that symbol display area (such as by displaying a plurality of reels spinning and stopping in association with the symbol display areas), as indicated by block 104. In this example embodiment, for each symbol of the set of symbols, that symbol is included in one of a plurality of different groups of the symbols. Additionally, in this example embodiment, each group of the symbols includes at least two different symbols of the set of symbols.

The gaming system determines if a triggering event associated with one of the groups of the symbols occurs, as indicated by diamond 106. If the gaming system determines that no such triggering event has occurred, the process 100 proceeds to block 110, described below. If, on the other hand, the gaming system determines that a triggering event associated with one of the groups of the symbols has occurred, for each of at least one displayed symbol in that group of the symbols, the gaming system replaces that displayed symbol with a different one of the symbols in that group of the symbols, as indicated by block 108. The gaming system determines any awards associated with the displayed symbols, as indicated by the block 110, and displays any determined awards, as indicated by block 112.

First Example Embodiment

FIGS. 2A, 2B, 2C, and 2D illustrate screen shots of one example embodiment of the gaming system of the present disclosure providing the slot game having the symbol replacement feature. In this example embodiment, as indicated in Table 1 below, the slot game employs the following set of a plurality of different symbols: L1, L2, L3, L4, L5, H1, H2, H3, H4, H5, T1, T2, T3, T4, and T5. As also indicated in Table 1 below, each symbol is categorized or included in: (a) one of the following three symbol value subsets: (i) a low-value symbol subset, (ii) a high-value symbol subset, and (iii) a triggering symbol subset; and (b) one of the following five symbol groups: (i) Group 1, (ii) Group 2, (iii) Group 3, (iv) Group 4, and (v) Group 5.

TABLE 1

Example Symbols and Associated Subsets and Groups

| Low-Value Symbol Subset | High-Value Symbol Subset | Triggering Symbol Subset | |
|---|---|---|---|
| L1 | H1 | T1 | Group 1 |
| L2 | H2 | T2 | Group 2 |
| L3 | H3 | T3 | Group 3 |
| L4 | H4 | T4 | Group 4 |
| L5 | H5 | T5 | Group 5 |

It should thus be appreciated that, in this example embodiment, each group of the symbols includes a different low-value symbol, a different high-value symbol, and a different triggering symbol. More specifically, in this example embodiment: (1) Group 1 includes the low-value symbol L1, the high-value symbol H1, and the triggering symbol T1; (2) Group 2 includes the low-value symbol L2, the high-value symbol H2, and the triggering symbol T2; (3) Group 3 includes the low-value symbol L3, the high-value symbol H3, and the triggering symbol T3; (4) Group 4 includes the low-value symbol L4, the high-value symbol H4, and the triggering symbol T4; and (5) Group 5 includes the low-value symbol L5, the high-value symbol H5, and the triggering symbol T5.

It should also be appreciated that, in this example embodiment, each particular symbol is categorized in or included in only one of the five groups of the symbols and in only one of the three subsets of the symbols. Put differently, in this example embodiment, none of the groups of the symbols shares a same one of the symbols and none of the subsets of the symbols shares a same one of the symbols.

In this example embodiment, the gaming system displays, such as on a display device 1116 (described below), a plurality of symbol display areas 210*a*, 210*b*, 210*c*, 210*d*, 210*e*, 210*f*, 210*g*, 210*h*, 210*i*, 210*j*, 210*k*, 210*l*, 210*m*, 210*n*, and 2100*o* arranged in a 3×5 grid or matrix. The gaming system also displays a plurality of reels 205*a*, 205*b*, 205*c*, 205*d*, and 205*e*, each of which includes a plurality of the symbols of the set of symbols, in association with the symbol display areas. More specifically, each reel 205*a*, 205*b*, 205*c*, 205*d*, and 205*e* is associated with, and configured to display symbols at, a plurality of the symbol display areas. In this example embodiment: (a) the reel 205*a* is associated with, and configured to display symbols at, the symbol display areas 210*a*, 210*f*, and 210*k*; (b) the reel 205*b* is associated with, and configured to display symbols at, the symbol display areas 210*b*, 210*g*, and 210*l*; (c) the reel 205*c* is associated with, and configured to display symbols at, the symbol display areas 210*c*, 210*h*, and 210*m*; (d) the reel 205*d* is associated with, and configured to display symbols at, the symbol display areas 210*d*, 210*i*, and 210*n*; and (e) the reel 205*e* is associated with, and configured to display symbols at, the symbol display areas 210*e*, 210*j*, and 210*o*. The slot game is associated with a plurality of paylines (not shown for clarity), each of which is associated with a different plurality of the symbol display areas.

The gaming system also displays: (a) a message box 230 that displays a variety of messages or indications before, during, or after play of the slot game; (b) a plurality of buttons actuatable by the player, including: (i) a Bet Per Line button 231 that, when actuated by the player, causes the gaming system to enable the player to select an amount to bet on each wagered-on payline; (ii) a Select Lines button 232 that, when actuated by the player, causes the gaming system to enable the player to select the paylines on which the player desires to wager for a play of the slot game; (iii) a Menu button 233 that, when actuated by the player, causes the gaming system to display additional information about the slot game, such as the paytable for the slot game and/or the rules of the slot game; (iv) a Max Bet button 234 that, when actuated by the player, causes the gaming system to set the amount bet on each payline to a maximum amount and to set the quantity of paylines on which the player desires to wager to a maximum quantity of the paylines; and (v) a Spin button 235 that, when actuated by the player, causes the gaming system to initiate a play of the slot game; and (c) a plurality of meters including: (i) a bet meter 236 that displays any bet placed on a play of the slot game (in credit or currency form), (ii) a credit meter 237 that displays the player's credit balance (in credit or currency form), and (iii) an award meter 238 that displays any awards won for the play of the slot game (in credit or currency form).

As noted above, the slot game includes a symbol replacement feature that the gaming system provides upon an occurrence of a triggering event. In this example embodiment, each group of the symbols is associated with a different triggering event, and the symbol replacement feature varies based on which particular triggering event occurs.

Turning to the triggering events, generally, for each group of the symbols in this example embodiment, the triggering event associated with that group of the symbols occurs when the triggering symbol included in that group of the symbols is displayed at each symbol display area of one of the columns of the symbol display areas. More specifically: (a) the triggering event associated with Group 1 occurs when the T1 symbol is displayed at each symbol display area of one of the columns of the symbol display areas, (b) the triggering event associated with Group 2 occurs when the T2 symbol is displayed at each symbol display area of one of the columns of the symbol display areas, (c) the triggering event associated with Group 3 occurs when the T3 symbol is displayed at each symbol display area of one of the columns of the symbol display areas, (d) the triggering event associated with Group 4 occurs when the T4 symbol is displayed at each symbol display area of one of the columns of the symbol display areas, and (e) the triggering event associated with Group 5 occurs when the T5 symbol is displayed at each symbol display area of one of the columns of the symbol display areas.

Turning to the symbol replacement feature, generally, for each group of the symbols in this example embodiment, when the triggering event associated with that group of the symbols occurs, the gaming system replaces any displayed low-value symbols included in that group of the symbols and any triggering symbols included in that group of the symbols with the high-value symbol included in that group of the symbols. More specifically: (a) when the triggering event associated with Group 1 occurs, the gaming system replaces any displayed L1 symbols and any displayed T1 symbols with an H1 symbol, (b) when the triggering event associated with Group 2 occurs, the gaming system replaces any displayed L2 symbols and any displayed T2 symbols with an H2 symbol, (c) when the triggering event associated with Group 3 occurs, the gaming system replaces any displayed L3 symbols and any displayed T3 symbols with an H3 symbol, (d) when the triggering event associated with Group 4 occurs, the gaming system replaces any displayed L4 symbols and any displayed T4 symbols with an H4 symbol, and (e) when the triggering event associated with Group 5 occurs, the gaming system replaces any displayed L5 symbols and any displayed T5 symbols with an H5 symbol.

Figure 2A:
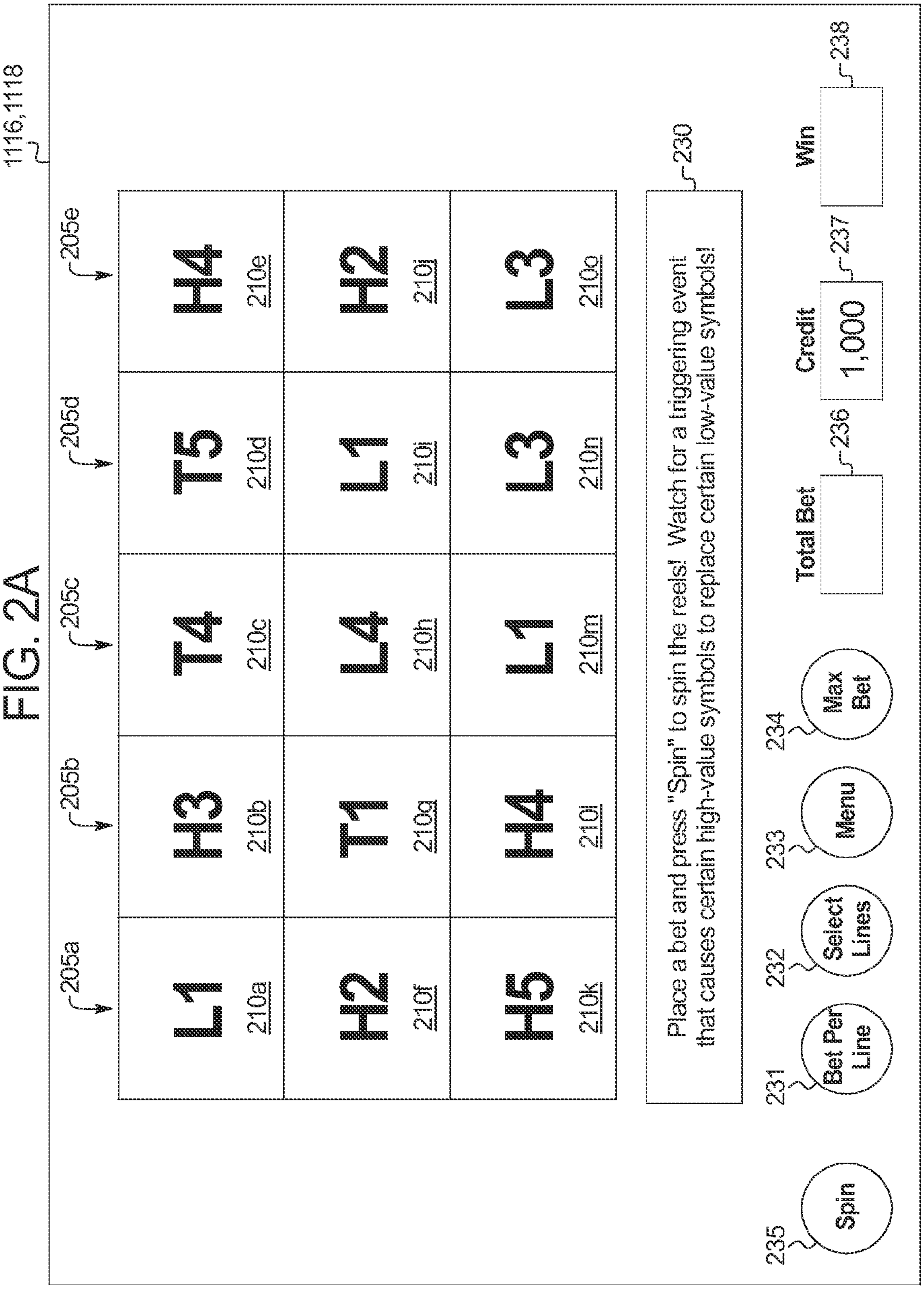
FIGS. 2A, 2B, 2C, and 2D illustrate screen shots of one example embodiment of the gaming system of the present disclosure providing the slot game having the symbol replacement feature.

Turning to FIG. 2A, the gaming system receives a deposit of value from a player and credits the player with 1,000 credits (as shown in the credit meter 237). The gaming system displays the following message in the message box 230: "PLACE A BET AND PRESS 'SPIN' TO SPIN THE REELS! WATCH FOR A TRIGGERING EVENT THAT CAUSES CERTAIN HIGH-VALUE SYMBOLS TO REPLACE CERTAIN LOW-VALUE SYMBOLS!"

Figure 2B:
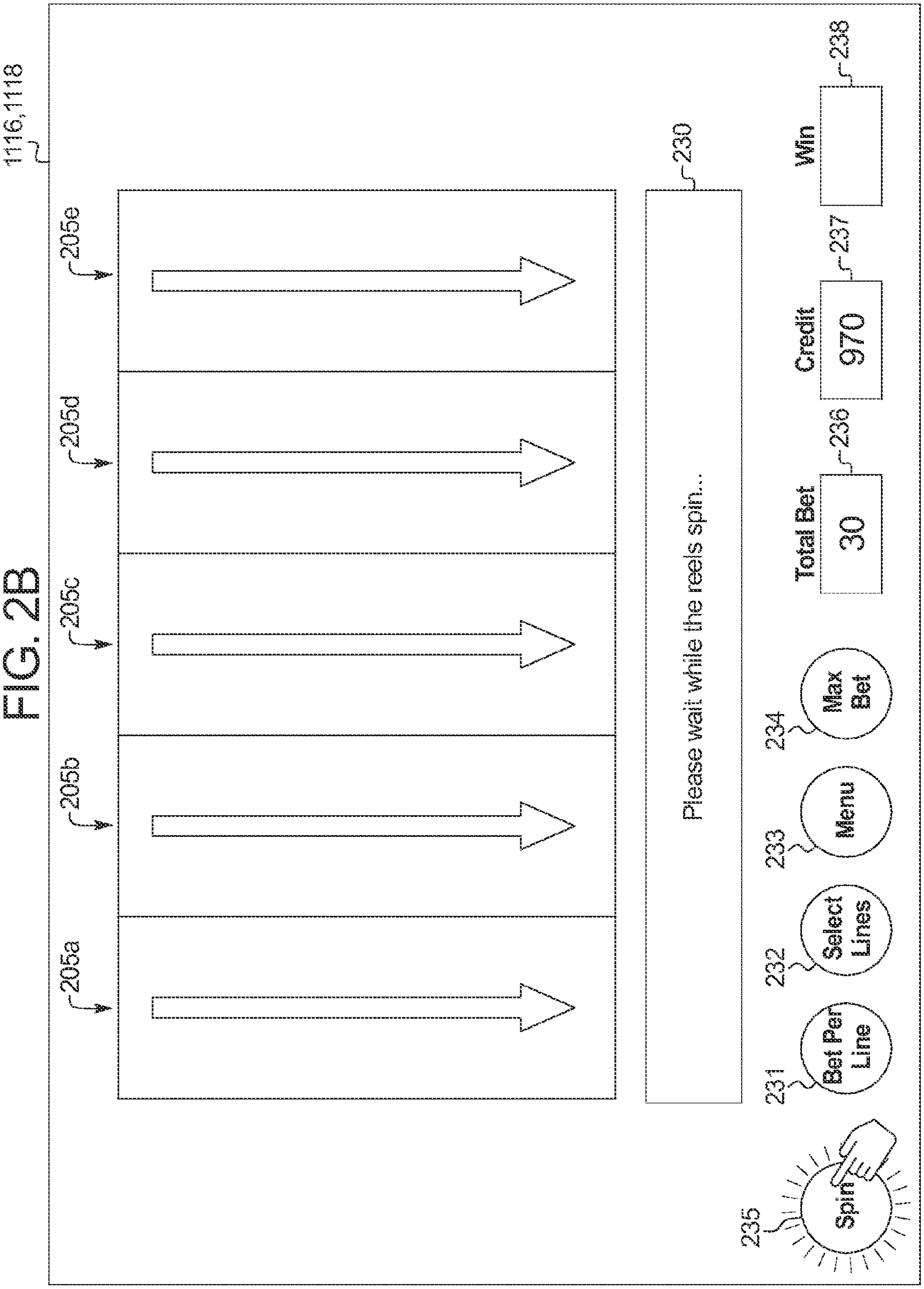

As shown in FIG. 2B, the gaming system receives a bet of 30 credits (as shown in the bet meter 236) and an actuation of the Spin button 235 from the player. Upon receiving the actuation of the Spin button 235, the gaming system reduces the player's credit balance by the 30 credit wager (as shown in the credit meter 237); initiates a play of the slot game; and displays the reels 205*a*, 205*b*, 205*c*, 205*d*, and 205*e* spinning. The gaming system displays the following message in the message box 230: "PLEASE WAIT WHILE THE REELS SPIN . . . ."

Figure 2C:
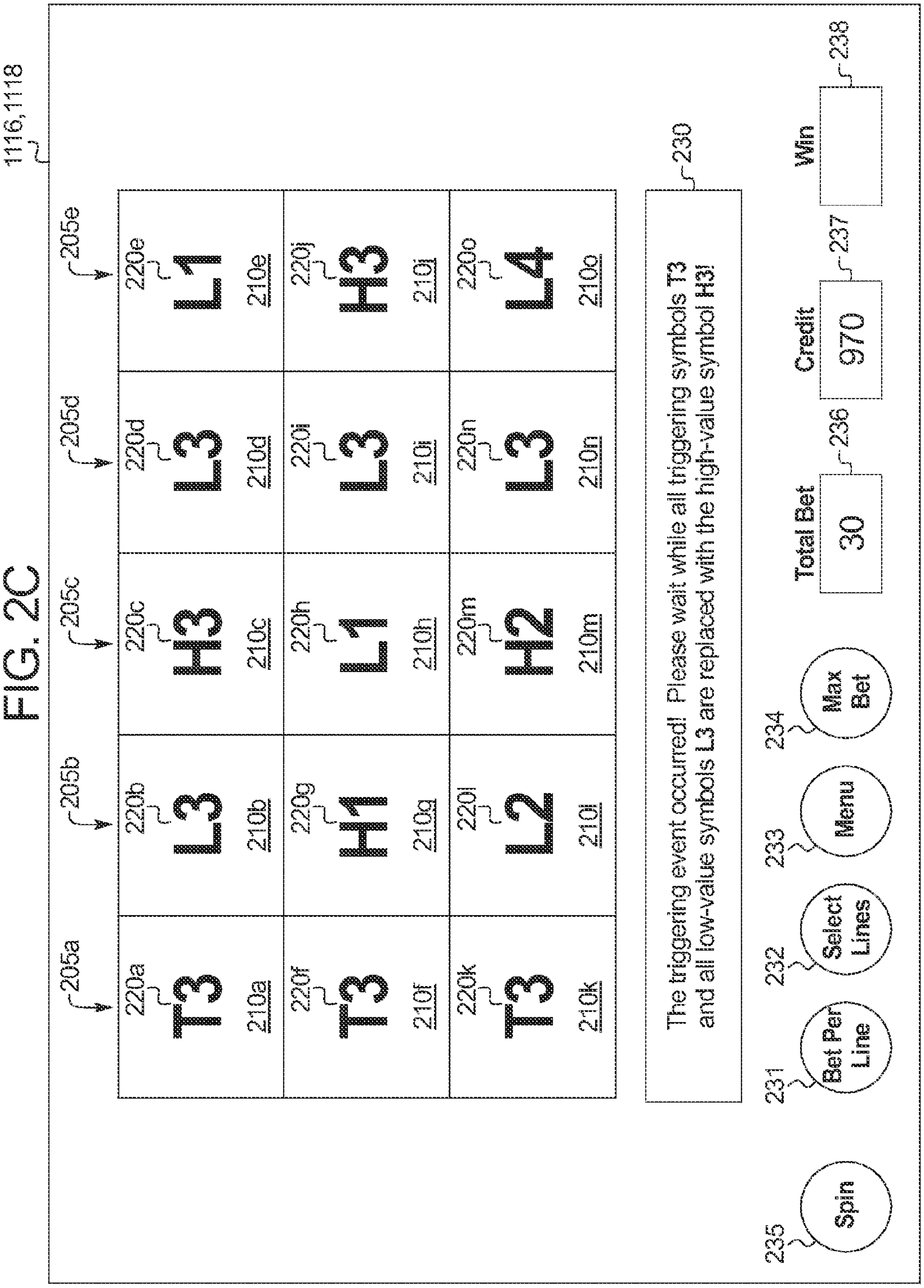

As illustrated in FIG. 2C, the gaming system stops spinning the reels 205*a*, 205*b*, 205*c*, 205*d*, and 205*e* such that: (a) T3 symbol 220*a* is displayed at the symbol display area 210*a*, (b) L3 symbol 220*b* is displayed at the symbol display area 210*b*, (c) H3 symbol 220*c* is displayed at the symbol display area 210*c*, (d) L3 symbol 220*d* is displayed at the symbol display area 210*d*, (e) L1 symbol 220*e* is displayed at the symbol display area 210*e*, (f) T3 symbol 220*f* is displayed at the symbol display area 210*f*, (g) H1 symbol 220*g* is displayed at the symbol display area 210*g*, (h) L1 symbol 220*h* is displayed at the symbol display area 210*h*, (i) L3 symbol 220*i* is displayed at the symbol display area 210*i*, (j) H3 symbol 220*j* is displayed at the symbol display area 210*j*, (k) T3 symbol 220*k* is displayed at the symbol display area 210*k*, (l) L2 symbol 220*l* is displayed at the symbol display area 210*l*, (m) H2 symbol 220*m* is displayed at the symbol display area 210*m*, (n) L3 symbol 220*n* is displayed at the symbol display area 210*n*, and (o) L4 symbol 220*o* is displayed at the symbol display area 210*o*.

In this example embodiment, before making any award determinations based on the displayed symbols, the gaming system determines whether to provide the symbol replacement feature and, therefore, determines whether any of the triggering events occurred based on the displayed symbols. In this instance, the gaming system determines that the triggering event associated with Group 3 occurred because the T3 symbol (i.e., the triggering symbol associated with Group 3) is displayed at each symbol display area of the column of symbol display areas associated with the reel 205*a* (i.e., the symbol display areas 210*a*, 210*f*, and 210*k*). The gaming system displays the following message in the message box 230: "THE TRIGGERING EVENT OCCURRED! PLEASE WAIT WHILE ALL TRIGGERING SYMBOLS T3 AND ALL LOW-VALUE SYMBOLS L3 ARE REPLACED WITH THE HIGH-VALUE SYMBOL H3!"

Figure 2D:
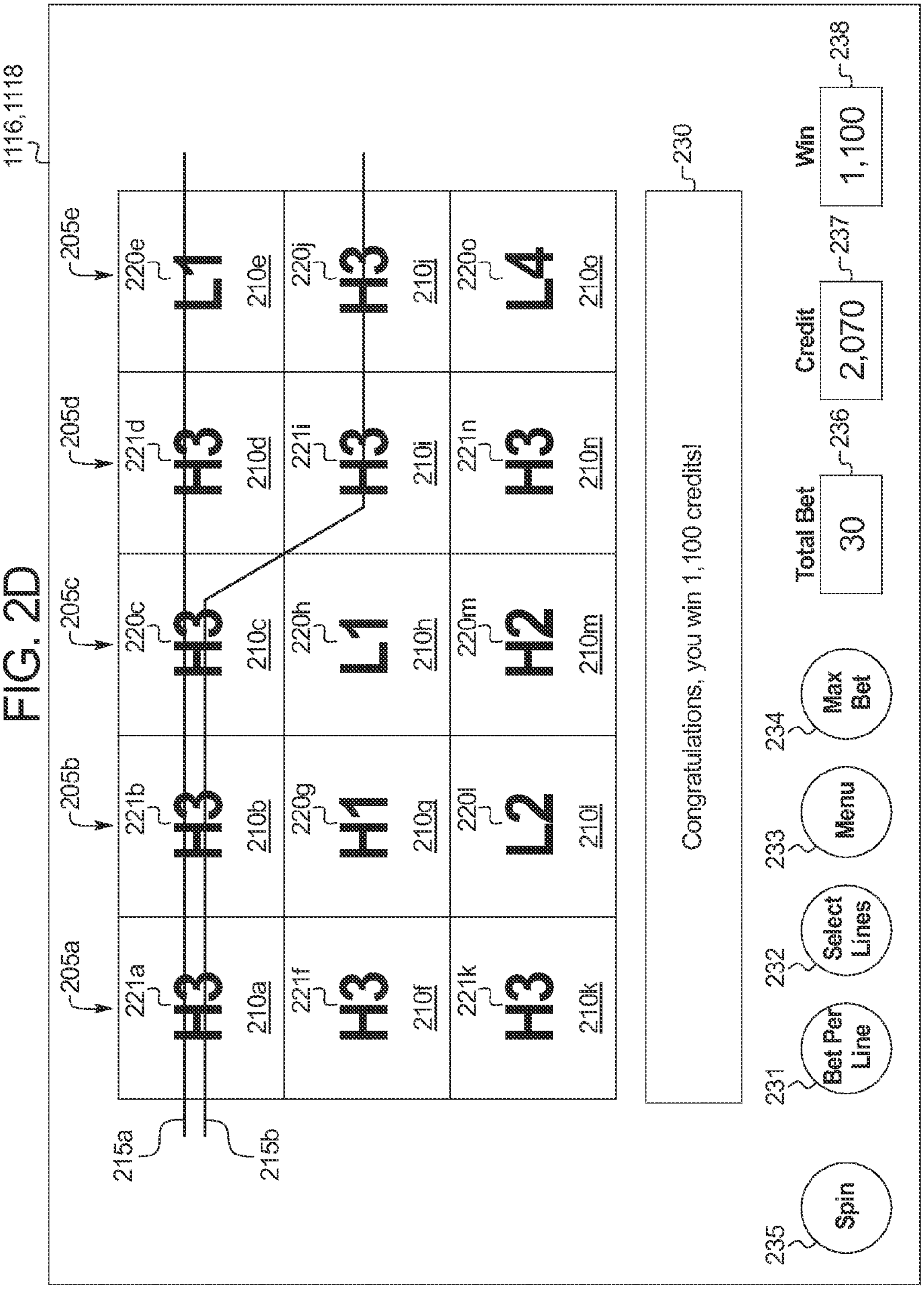

Accordingly, as illustrated in FIG. 2D, the gaming system replaces each displayed T3 and L3 symbol (i.e., each low-value symbol and each triggering symbol included in Group 3) with the H3 symbol (i.e., the high-value symbol included in Group 3). More specifically, the gaming system replaces: (a) the T3 symbol 220*a* with the H3 symbol 221*a*, (b) the L3 symbol 220*b* with the H3 symbol 221*b*, (c) the L3 symbol 220*d* with the H3 symbol 221*d*, (d) the T3 symbol 220*f* with the H3 symbol 221*f*, (e) the L3 symbol 220*i* with the H3 symbol 221*i*, (f) the T3 symbol 220*k* with the H3 symbol 221*k*, and (g) the L3 symbol 220*n* with the H3 symbol 221*n*.

Thereafter, the gaming system determines any awards associated with the symbols displayed at the symbol display areas by determining whether any winning combinations of the symbols included in the paytable (not shown) associated with the slot game are displayed at the symbol display areas associated with any of the wagered-on paylines (not shown). In this instance, the gaming system determines: (a) an award of 100 credits associated with the H3-H3-H3-H3 winning symbol combination displayed at the symbol display areas associated with a payline 215*a*; and (b) an award of 1,000 credits associated with the H3-H3-H3-H3-H3 winning symbol combination displayed at the symbol display areas associated with a payline 215*b*. The gaming system displays the total award of 1,100 credits in the award meter 238 and updates the player's credit meter 237 to reflect the total award of 1,100 credits. The gaming system displays the following message in the message box 230: "CONGRATULATIONS, YOU WIN 1,100 CREDITS!"

Second Example Embodiment

Figure 3A:
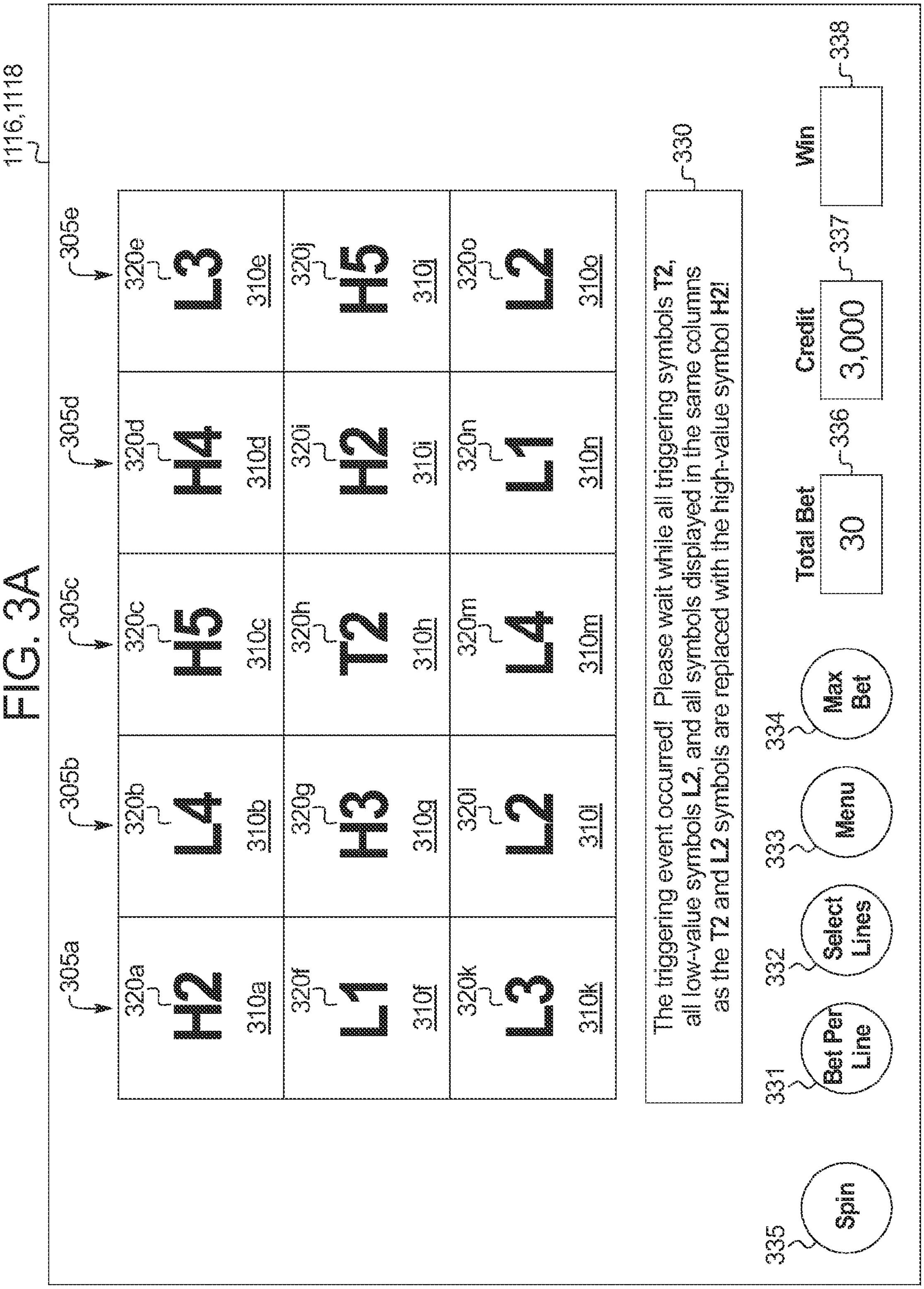
FIGS. 3A and 3B illustrate screen shots of another example embodiment of the gaming system of the present disclosure providing the slot game having the symbol replacement feature.
Figure 3B:
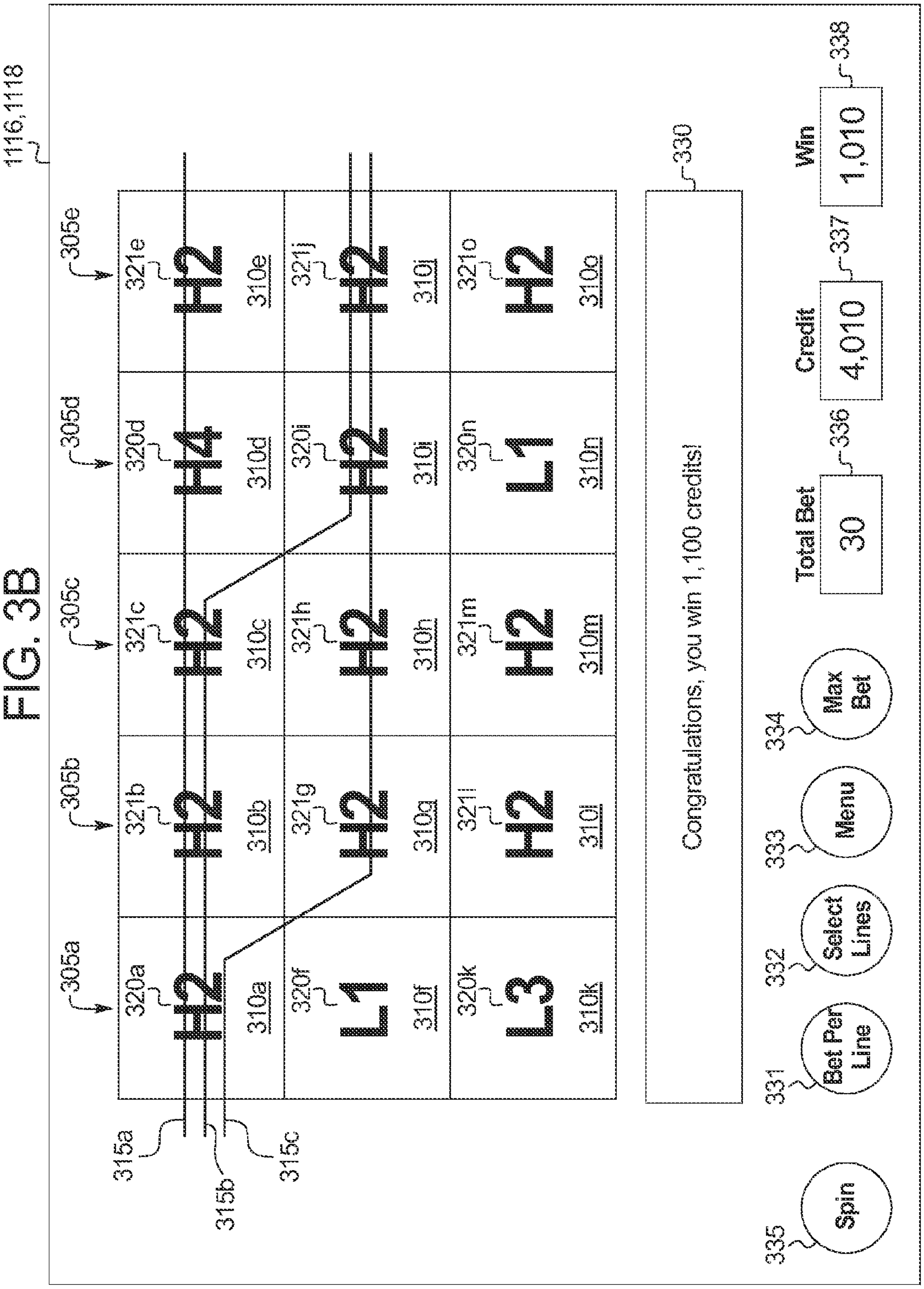

FIGS. 3A and 3B illustrate screen shots of another example embodiment of the gaming system of the present disclosure providing the slot game having the symbol replacement feature. In this example embodiment, as indicated in Table 2 below, the slot game employs the following set of a plurality of different symbols: L1, L2, L3, L4, L5, H1, H2, H3, H4, H5, T1, T2, T3, T4, and T5. As also indicated in Table 2 below, each symbol is categorized or included in: (a) one of the following three symbol value subsets: (i) a low-value symbol subset, (ii) a high-value symbol subset, and (iii) a triggering symbol subset; and (b) one of the following five symbol groups: (i) Group 1, (ii) Group 2, (iii) Group 3, (iv) Group 4, and (v) Group 5.

TABLE 2

Example Symbols and Associated Subsets and Groups

| Low-Value Symbol Subset | High-Value Symbol Subset | Triggering Symbol Subset | |
|---|---|---|---|
| L1 | H1 | T1 | Group 1 |
| L2 | H2 | T2 | Group 2 |
| L3 | H3 | T3 | Group 3 |
| L4 | H4 | T4 | Group 4 |
| L5 | H5 | T5 | Group 5 |

It should thus be appreciated that, in this example embodiment, each group of the symbols includes a different low-value symbol, a different high-value symbol, and a different triggering symbol. More specifically, in this example embodiment: (1) Group 1 includes the low-value symbol L1, the high-value symbol H1, and the triggering symbol T1; (2) Group 2 includes the low-value symbol L2, the high-value symbol H2, and the triggering symbol T2; (3) Group 3 includes the low-value symbol L3, the high-value symbol H3, and the triggering symbol T3; (4) Group 4 includes the low-value symbol L4, the high-value symbol H4, and the triggering symbol T4; and (5) Group 5 includes the low-value symbol L5, the high-value symbol H5, and the triggering symbol T5.

It should also be appreciated that, in this example embodiment, each particular symbol is categorized in or included in only one of the five groups of the symbols and in only one of the three subsets of the symbols. Put differently, in this example embodiment, none of the groups of the symbols shares a same one of the symbols and none of the subsets of the symbols shares a same one of the symbols.

In this example embodiment, the gaming system displays, such as on a display device 1116 (described below), a plurality of symbol display areas 310*a*, 310*b*, 310*c*, 310*d*, 310*e*, 310*f*, 310*g*, 310*h*, 310*i*, 310*j*, 310*k*, 3101, 310*m*, 310*n*, and 310*o* arranged in a 3×5 grid or matrix. The gaming system also displays a plurality of reels 305*a*, 305*b*, 305*c*, 305*d*, and 305*e*, each of which includes a plurality of the symbols of the set of symbols, in association with the symbol display areas. More specifically, each reel 305*a*, 305*b*, 305*c*, 305*d*, and 305*e* is associated with, and configured to display symbols at, a plurality of the symbol display areas. In this example embodiment: (a) the reel 305*a* is associated with, and configured to display symbols at, the symbol display areas 310*a*, 310*f*, and 310*k*; (b) the reel 305*b* is associated with, and configured to display symbols at, the symbol display areas 310*b*, 310*g*, and 310*l*; (c) the reel 305*c* is associated with, and configured to display symbols at, the symbol display areas 310*c*, 310*h*, and 310*m*; (d) the reel 305*d* is associated with, and configured to display symbols at, the symbol display areas 310*d*, 310*i*, and 310*n*; and (e) the reel 305*e* is associated with, and configured to display symbols at, the symbol display areas 310*e*, 310*j*, and 310*o*. The slot game is associated with a plurality of paylines (not shown for clarity), each of which is associated with a different plurality of the symbol display areas.

The gaming system also displays: (a) a message box 330 that displays a variety of messages or indications before, during, or after play of the slot game; (b) a plurality of buttons actuatable by the player, including: (i) a Bet Per Line button 331 that, when actuated by the player, causes the gaming system to enable the player to select an amount to bet on each wagered-on payline; (ii) a Select Lines button 332 that, when actuated by the player, causes the gaming system to enable the player to select the paylines on which the player desires to wager for a play of the slot game; (iii) a Menu button 333 that, when actuated by the player, causes the gaming system to display additional information about the slot game, such as the paytable for the slot game and/or the rules of the slot game; (iv) a Max Bet button 334 that, when actuated by the player, causes the gaming system to set the amount bet on each payline to a maximum amount and to set the quantity of paylines on which the player desires to wager to a maximum quantity of the paylines; and (v) a Spin button 335 that, when actuated by the player, causes the gaming system to initiate a play of the slot game; and (c) a plurality of meters including: (i) a bet meter 336 that displays any bet placed on a play of the slot game (in credit or currency form), (ii) a credit meter 337 that displays the player's credit balance (in credit or currency form), and (iii) an award meter 338 that displays any awards won for the play of the slot game (in credit or currency form).

As noted above, the slot game includes a symbol replacement feature that the gaming system provides upon an occurrence of a triggering event. In this example embodiment, each group of the symbols is associated with a different triggering event, and the symbol replacement feature varies based on which particular triggering event occurs.

Turning to the triggering events, generally, for each group of the symbols in this example embodiment, the triggering event associated with that group of the symbols occurs when the triggering symbol included in that group of the symbols is displayed at at least one of the symbol display areas. More specifically: (a) the triggering event associated with Group 1 occurs when the T1 symbol is displayed at at least one of the symbol display areas, (b) the triggering event associated with Group 2 occurs when T2 symbol is displayed at at least one of the symbol display areas, (c) the triggering event associated with Group 3 occurs when the T3 symbol is displayed at at least one of the symbol display areas, (d) the triggering event associated with Group 4 occurs when the T4 symbol is displayed at at least one of the symbol display areas, and (e) the triggering event associated with Group 5 occurs when the T5 symbol is displayed at at least one of the symbol display areas.

Turning to the symbol replacement feature, generally, for each group of the symbols in this example embodiment, when the triggering event associated with that group of the symbols occurs, the gaming system replaces: (a) any displayed low-value symbols included in that group of the symbols, (b) any displayed triggering symbols included in that group of the symbols, and (c) the symbols displayed at any symbol display areas in the same column as the symbol display areas (if any) displaying that low-value symbol or that triggering symbol with the high-value symbol included in that group of the symbols. More specifically: (a) when the triggering event associated with Group 1 occurs, the gaming system replaces: (i) any displayed L1 symbols, (ii) any displayed T1 symbols, and (iii) any symbols displayed at any symbol display areas in the same column as the symbol display areas (if any) displaying the L1 symbol or the T1 symbol with an H1 symbol; (b) when the triggering event associated with Group 2 occurs, the gaming system replaces: (i) any displayed L2 symbols, (ii) any displayed T2 symbols, and (iii) any symbols displayed at any symbol display areas in the same column as the symbol display areas (if any) displaying the L2 symbol or the T2 symbol with an H2 symbol; (c) when the triggering event associated with Group 3 occurs, the gaming system replaces: (i) any displayed L3 symbols, (ii) any displayed T3 symbols, and (iii) any symbols displayed at any symbol display areas in the same column as the symbol display areas (if any) displaying the L3 symbol or the T3 symbol with an H3 symbol; (d) when the triggering event associated with Group 4 occurs, the gaming system replaces: (i) any displayed L4 symbols, (ii) any displayed T4 symbols, and (iii) any symbols displayed at any symbol display areas in the same column as the symbol display areas (if any) displaying the L4 symbol or the T4 symbol with an H4 symbol; and (e) when the triggering event associated with Group 5 occurs, the gaming system replaces: (i) any displayed L5 symbols, (ii) any displayed T5 symbols, and (iii) any symbols displayed at any symbol display areas in the same column as the symbol display areas (if any) displaying the L5 symbol or the T5 symbol with an H5 symbol.

Turning to FIG. 3A, the gaming system has spun and stopped the reels 305*a*, 305*b*, 305*c*, 305*d*, and 305*e* such that: (a) H2 symbol 320*a* is displayed at the symbol display area 310*a*, (b) L4 symbol 320*b* is displayed at the symbol display area 310*b*, (c) H5 symbol 320*c* is displayed at the symbol display area 310*c*, (d) H4 symbol 320*d* is displayed at the symbol display area 310*d*, (e) L3 symbol 320*e* is displayed at the symbol display area 310*e*, (f) L1 symbol 320*f* is displayed at the symbol display area 310*f*, (g) H3 symbol 320*g* is displayed at the symbol display area 310*g*, (h) T2 symbol 320*h* is displayed at the symbol display area 310*h*, (i) H2 symbol 320*i* is displayed at the symbol display area 310*i*, (j) H5 symbol 320*j* is displayed at the symbol display area 310*j*, (k) L3 symbol 320*k* is displayed at the symbol display area 310*k*, (l) L2 symbol 320*l* is displayed at the symbol display area 310*l*, (m) L4 symbol 320*m* is displayed at the symbol display area 310*m*, (n) L1 symbol 320*n* is displayed at the symbol display area 310*n*, and (o) L2 symbol 3200 is displayed at the symbol display area 310*o*.

In this example embodiment, before making any award determinations based on the displayed symbols, the gaming system determines whether to provide the symbol replacement feature and, therefore, determines whether any of the triggering events occurred based on the displayed symbols. In this instance, the gaming system determines that the triggering event associated with Group 2 occurred because the T2 symbol (i.e., the triggering symbol included in Group 2) is displayed at at least one of the symbol display areas (i.e., the symbol display area 310*h*). The gaming system displays the following message in the message box 330: "THE TRIGGERING EVENT OCCURRED! PLEASE WAIT WHILE ALL TRIGGERING SYMBOLS T2, ALL LOW-VALUE SYMBOLS L2, AND ALL SYMBOLS DISPLAYED IN THE SAME COLUMN AS THE T2 AND L2 SYMBOLS ARE REPLACED WITH THE HIGH-VALUE SYMBOL H2!"

Accordingly, as illustrated in FIG. 3B, the gaming system replaces: (a) any displayed L2 symbols, (b) any displayed T2 symbols, and (c) any symbols displayed at any symbol display areas in the same column as the symbol display areas (if any) displaying the L2 symbol or the T2 symbol with an H2 symbol. More specifically, the gaming system replaces: (a) the L2 symbol 320*l* with the H2 symbol 321*l*; (b) the H3 symbol 320*g* and the L4 symbol 320*b*, which are displayed at the symbol display areas in the same column as the symbol display area that formerly displayed the L2 symbol 320*l*, with the H2 symbol 321*g* and the H2 symbol 321*b*; (c) the T2 symbol 320*h* with the H2 symbol 321*h*; (d) the H5 symbol 320*c* and the L4 symbol 320*m*, which are displayed at the symbol display areas in the same column as the symbol display area that formerly displayed the T2 symbol 320*h*, with the H2 symbol 321*c* and the H2 symbol 321*m*; (e) the L2 symbol 3200 with the H2 symbol 321*o*; and (f) the L3 symbol 320*e* and the H5 symbol 320*j*, which are displayed at the symbol display areas in the same column as the symbol display area that formerly displayed the L2 symbol 320*o*, with the H2 symbol 321*e* and the H2 symbol 321*i*.

Thereafter, the gaming system determines any awards associated with the symbols displayed at the symbol display areas by determining whether any winning combinations of the symbols included in the paytable (not shown) associated with the slot game are displayed at the symbol display areas associated with any of the wagered-on paylines (not shown). In this instance, the gaming system determines: (a) an award of 10 credits associated with the H2-H2-H2 winning symbol combination displayed at the symbol display areas associated with a payline 315*a*; (b) an award of 500 credits associated with the H2-H2-H2-H2-H2 winning symbol combination displayed at the symbol display areas associated with a payline 315*b*; and (c) an award of 500 credits associated with the H2-H2-H2-H2-H2 winning symbol combination displayed at the symbol display areas associated with a payline 315*c*. The gaming system displays the total award of 1,010 credits in the award meter 338 and updates the player's credit meter 337 to reflect the total award of 1,010 credits. The gaming system displays the following message in the message box 330: "CONGRATULATIONS, YOU WIN 1,010 CREDITS!"

Third Example Embodiment

Figure 4A:
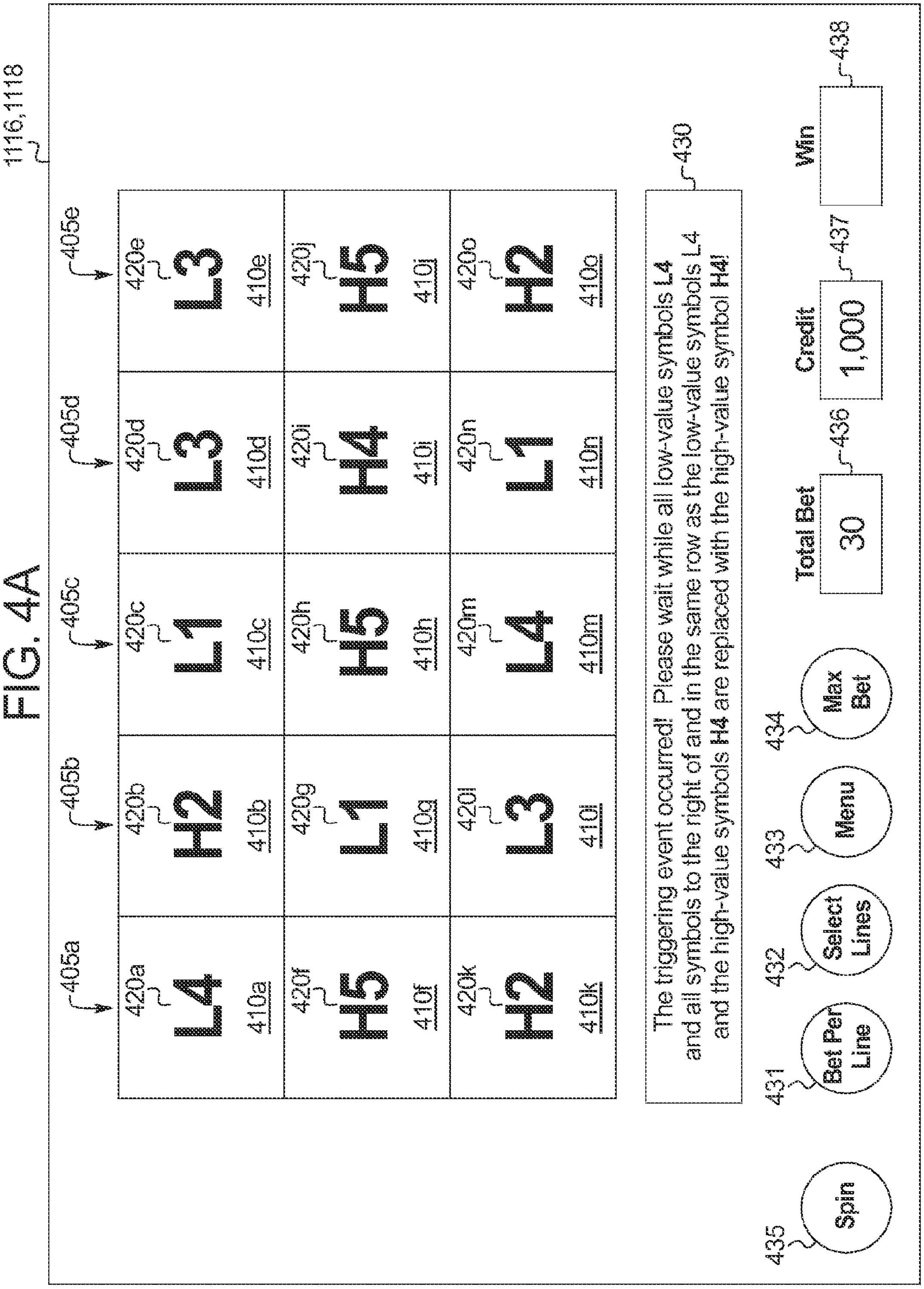
FIGS. 4A and 4B illustrate screen shots of another example embodiment of the gaming system of the present disclosure providing the slot game having the symbol replacement feature.
Figure 4B:
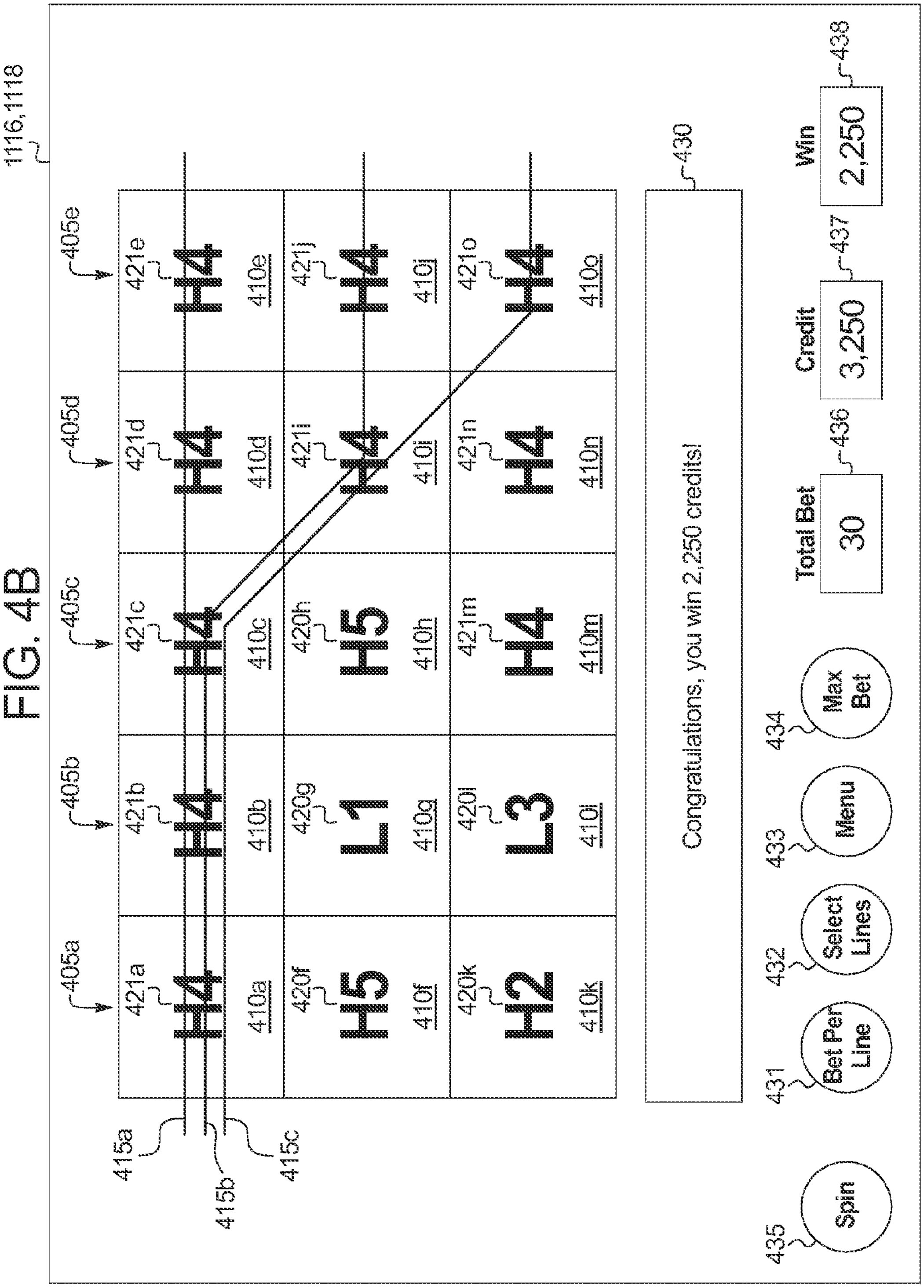

FIGS. 4A and 4B illustrate screen shots of another example embodiment of the gaming system of the present disclosure providing the slot game having the symbol replacement feature. In this example embodiment, as indicated in Table 3 below, the slot game employs the following set of a plurality of different symbols: L1, L2, L3, L4, L5, H1, H2, H3, H4, and H5. As also indicated in Table 3 below, each symbol is categorized or included in: (a) one of the following two symbol value subsets: (i) a low-value symbol subset, and (ii) a high-value symbol subset; and (b) one of the following five symbol groups: (i) Group 1, (ii) Group 2, (iii) Group 3, (iv) Group 4, and (v) Group 5.

TABLE 3

Example Symbols and Associated Subsets and Groups

| Low-Value Symbol Subset | High-Value Symbol Subset | |
|---|---|---|
| L1 | H1 | Group 1 |
| L2 | H2 | Group 2 |
| L3 | H3 | Group 3 |
| L4 | H4 | Group 4 |
| L5 | H5 | Group 5 |

It should thus be appreciated that, in this example embodiment, each group of the symbols includes a different low-value symbol and a different high-value symbol. More specifically, in this example embodiment: (1) Group 1 includes the low-value symbol L1 and the high-value symbol H1; (2) Group 2 includes the low-value symbol L2 and the high-value symbol H2; (3) Group 3 includes the low-value symbol L3 and the high-value symbol H3; (4) Group 4 includes the low-value symbol L4 and the high-value symbol H4; and (5) Group 5 includes the low-value symbol L5 and the high-value symbol H5.

It should also be appreciated that, in this example embodiment, each particular symbol is categorized in or included in only one of the five groups of the symbols and in only one of the two subsets of the symbols. Put differently, in this example embodiment, none of the groups of the symbols shares a same one of the symbols and none of the subsets of the symbols shares a same one of the symbols.

In this example embodiment, the gaming system displays, such as on a display device 1116 (described below), a plurality of symbol display areas 410*a*, 410*b*, 410*c*, 410*d*, 410*e*, 410*f*, 410*g*, 410*h*, 410*i*, 410*j*, 410*k*, 410*l*, 410*m*, 410*n*, and 410*o* arranged in a 3×5 grid or matrix. The gaming system also displays a plurality of reels 405*a*, 405*b*, 405*c*, 405*d*, and 405*e*, each of which includes a plurality of the symbols of the set of symbols, in association with the symbol display areas. More specifically, each reel 405*a*, 405*b*, 405*c*, 405*d*, and 405*e* is associated with, and configured to display symbols at, a plurality of the symbol display areas. In this example embodiment: (a) the reel 405*a* is associated with, and configured to display symbols at, the symbol display areas 410*a*, 410*f*, and 410*k*; (b) the reel 405*b* is associated with, and configured to display symbols at, the symbol display areas 410*b*, 410*g*, and 410*l*; (c) the reel 405*c* is associated with, and configured to display symbols at, the symbol display areas 410*c*, 410*h*, and 410*m*; (d) the reel 405*d* is associated with, and configured to display symbols at, the symbol display areas 410*d*, 410*i*, and 410*n*; and (e) the reel 405*e* is associated with, and configured to display symbols at, the symbol display areas 410*e*, 410*j*, and 410*o*. The slot game is associated with a plurality of paylines (not shown for clarity), each of which is associated with a different plurality of the symbol display areas.

The gaming system also displays: (a) a message box 430 that displays a variety of messages or indications before, during, or after play of the slot game; (b) a plurality of buttons actuatable by the player, including: (i) a Bet Per Line button 431 that, when actuated by the player, causes the gaming system to enable the player to select an amount to bet on each wagered-on payline; (ii) a Select Lines button 432 that, when actuated by the player, causes the gaming system to enable the player to select the paylines on which the player desires to wager for a play of the slot game; (iii) a Menu button 433 that, when actuated by the player, causes the gaming system to display additional information about the slot game, such as the paytable for the slot game and/or the rules of the slot game; (iv) a Max Bet button 434 that, when actuated by the player, causes the gaming system to set the amount bet on each payline to a maximum amount and to set the quantity of paylines on which the player desires to wager to a maximum quantity of the paylines; and (v) a Spin button 435 that, when actuated by the player, causes the gaming system to initiate a play of the slot game; and (c) a plurality of meters including: (i) a bet meter 436 that displays any bet placed on a play of the slot game (in credit or currency form), (ii) a credit meter 437 that displays the player's credit balance (in credit or currency form), and (iii) an award meter 438 that displays any awards won for the play of the slot game (in credit or currency form).

As noted above, the slot game includes a symbol replacement feature that the gaming system provides upon an occurrence of a triggering event. In this example embodiment, each group of the symbols is associated with a different triggering event, and the symbol replacement feature varies based on which particular triggering event occurs.

Turning to the triggering events, generally, for each group of the symbols in this example embodiment, the triggering event associated with that group of the symbols occurs when each symbol included in that group of the symbols is displayed at at least one of the symbol display areas. More specifically: (a) the triggering event associated with Group 1 occurs when the L1 symbol is displayed at at least one of the symbol display areas and the H1 symbol is displayed at at least one of the symbol display areas, (b) the triggering event associated with Group 2 occurs when the L2 symbol is displayed at at least one of the symbol display areas and the H2 symbol is displayed at at least one of the symbol display areas, (c) the triggering event associated with Group 3 occurs when the L3 symbol is displayed at at least one of the symbol display areas and the H3 symbol is displayed at at least one of the symbol display areas, (d) the triggering event associated with Group 4 occurs when the L4 symbol is displayed at at least one of the symbol display areas and the H4 symbol is displayed at at least one of the symbol display areas, and (e) the triggering event associated with Group 5 occurs when the L5 symbol is displayed at at least one of the symbol display areas and the H5 symbol is displayed at at least one of the symbol display areas.

Turning to the symbol replacement feature, generally, for each group of the symbols in this example embodiment, when the triggering event associated with that group of the symbols occurs, the gaming system replaces: (a) any displayed low-value symbols included in that group of the symbols and any symbols displayed at symbol display areas to the right of and in the same row as the symbol display areas displaying those low-value symbols with the high-value symbol in that group of the symbols, and (b) any symbols displayed at symbol display areas to the right of and in the same row as any symbol display areas displaying the high-value symbol in that group of the symbols with the high-value symbol in that group of the symbols. More specifically: (a) when the triggering event associated with Group 1 occurs, the gaming system replaces: (i) any displayed L1 symbols, (ii) the symbols displayed at any symbol display areas to the right of and in the same row as the symbol display areas displaying such L1 symbols, and (iii) the symbols displayed at any symbol display areas to the right of and in the same row as any symbol display areas displaying the H1 symbol with the H1 symbol; (b) when the triggering event associated with Group 2 occurs, the gaming system replaces: (i) any displayed L2 symbols, (ii) the symbols displayed at any symbol display areas to the right of and in the same row as the symbol display areas displaying such L2 symbols, and (iii) the symbols displayed at any symbol display areas to the right of and in the same row as any symbol display areas displaying the H2 symbol with the H2 symbol; (c) when the triggering event associated with Group 3 occurs, the gaming system replaces: (i) any displayed L3 symbols, (ii) the symbols displayed at any symbol display areas to the right of and in the same row as the symbol display areas displaying such L3 symbols, and (iii) the symbols displayed at any symbol display areas to the right of and in the same row as any symbol display areas displaying the H3 symbol with the H3 symbol; (d) when the triggering event associated with Group 4 occurs, the gaming system replaces: (i) any displayed L4 symbols, (ii) the symbols displayed at any symbol display areas to the right of and in the same row as the symbol display areas displaying such L4 symbols, and (iii) the symbols displayed at any symbol display areas to the right of and in the same row as any symbol display areas displaying the H4 symbol with the H4 symbol; and (e) when the triggering event associated with Group 5 occurs, the gaming system replaces: (i) any displayed L5 symbols, (ii) the symbols displayed at any symbol display areas to the right of and in the same row as the symbol display areas displaying such L5 symbols, and (iii) the symbols displayed at any symbol display areas to the right of and in the same row as any symbol display areas displaying the H5 symbol with the H5 symbol.

Turning to FIG. 4A, the gaming system has spun and stopped the reels 405*a*, 405*b*, 405*c*, 405*d*, and 405*e* of the first set such that: (a) L4 symbol 420*a* is displayed at the symbol display area 410*a*, (b) H2 symbol 420*b* is displayed at the symbol display area 410*b*, (c) L1 symbol 420*c* is displayed at the symbol display area 410*c*, (d) L3 symbol 420*d* is displayed at the symbol display area 410*d*, (e) L3 symbol 420*e* is displayed at the symbol display area 410*e*, (f) H5 symbol 420*f* is displayed at the symbol display area 410*f*, (g) L1 symbol 420*g* is displayed at the symbol display area 410*g*, (h) H5 symbol 420*h* is displayed at the symbol display area 410*h*, (i) H4 symbol 420*i* is displayed at the symbol display area 410*i*, (j) H5 symbol 420*j* is displayed at the symbol display area 410*j*, (k) H2 symbol 420*k* is displayed at the symbol display area 410*k*, (l) L3 symbol 420*l* is displayed at the symbol display area 410*l*, (m) L4 symbol 420*m* is displayed at the symbol display area 410*m*, (n) L1 symbol 420*n* is displayed at the symbol display area 410*n*, and (o) H2 symbol 4200 is displayed at the symbol display area 410*o*.

In this example embodiment, before making any award determinations based on the displayed symbols, the gaming system determines whether to provide the symbol replacement feature and, therefore, determines whether any of the triggering events occurred based on the displayed symbols. In this instance, the gaming system determines that the triggering event associated with Group 4 occurred because the L4 symbol is displayed at at least one of the symbol display areas and the H4 symbol is displayed at at least one of the symbol display areas. The gaming system displays the following message in the message box 430: "THE TRIGGERING EVENT OCCURRED! PLEASE WAIT WHILE ALL LOW-VALUE SYMBOLS L4 AND ALL SYMBOLS DISPLAYED TO THE RIGHT OF AND IN THE SAME ROW AS THE LOW-VALUE SYMBOLS L4 AND THE HIGH-VALUE SYMBOLS H4 ARE REPLACED WITH THE HIGH-VALUE SYMBOL H4!"

Accordingly, as illustrated in FIG. 4B, the gaming system replaces: (i) any displayed L4 symbols, (ii) the symbols displayed at any symbol display areas to the right of and in the same row as the symbol display areas displaying such L4 symbols, and (iii) the symbols displayed at any symbol display areas to the right of and in the same row as any symbol display areas displaying the H4 symbol with the H4 symbol. More specifically, the gaming system replaces: (a) the L4 symbol 420*a* with the H4 symbol 421*a*; (b) the H2 symbol 420*b*, the L1 symbol 420*c*, the L3 symbol 420*d*, and the L3 symbol 420*e*, which are displayed at the symbol display areas to the right of and in the same row as the symbol display area 410*a* that formerly displayed the L4 symbol 420*a*, with the H4 symbol 421*b*, and H4 symbol 421*c*, the H4 symbol 421*d*, and the H4 symbol 421*e*; (c) the H5 symbol 420*j*, which is displayed at the symbol display area to the right of and in the same row as the symbol display area 410*i* that displays the H4 symbol 420*i*, with the H4 symbol 421*j*; (d) the L4 symbol 420*m* with the H4 symbol 421*m*; and (e) the L1 symbol 420*n* and the H2 symbol 420*o*, which are displayed at the symbol display areas to the right of and in the same row as the symbol display area 410*m* that formerly displayed the L4 symbol 420*m*, with the H4 symbol 421*n* and the H4 symbol 421*o*.

Thereafter, the gaming system determines any awards associated with the symbols displayed at the symbol display areas by determining whether any winning combinations of the symbols included in the paytable (not shown) associated with the slot game are displayed at the symbol display areas associated with any of the wagered-on paylines (not shown). In this instance, the gaming system determines: (a) an award of 750 credits associated with the H4-H4-H4-H4-H4 winning symbol combination displayed at the symbol display areas associated with a payline 415*a*; (b) an award of 750 credits associated with the H4-H4-H4-H4-H4 winning symbol combination displayed at the symbol display areas associated with a payline 415*b*; and (c) an award of 750 credits associated with the H4-H4-H4-H4-H4 winning symbol combination displayed at the symbol display areas associated with a payline 415*c*. The gaming system displays the total award of 2,250 credits in the award meter 438 and updates the players credit meter 437 to reflect the total award of 2,250 credits. The gaming system displays the following message in the message box 430: "CONGRATULATIONS, YOU WIN 2,250 CREDITS!"

Variations

It should be appreciated that the triggering event that causes the gaming system to provide the reel replacement feature may be any suitable event, such as (but not limited to): (a) the display of a designated symbol (such as a triggering symbol) in each of a designated quantity of at least one of the symbol display areas following a spin of the reels; (b) the display of a designated symbol (such as a triggering symbol) in each of one or more designated symbol display areas; (c) the display of a designated symbol combination (such as a combination of a plurality of triggering symbols); (d) the display of a winning symbol combination following a spin of the reels; (e) the gaming system providing the player a designated award (such as a progressive award or a jackpot award); (f) a total quantity of plays of the slot game played by the player during a gaming session reaching a designated quantity of plays; (g) the gaming system receiving a deposit of value to fund the gaming system at least a designated quantity of times during a gaming session; (h) a total amount wagered by the player during a gaming session reaching a designated amount wagered; (i) a total amount of credits or currency won by the player during a gaming session reaching a designated amount won; (j) a total amount of credits or currency lost by the player during a gaming session reaching a designated amount lost; (k) a time of day reaching a designated time of day; (l) a length of a gaming session reaching a designated length of time; (m) a play of a bonus game having not been provided within a designated amount of time during a gaming session; (n) a play of a bonus game having not been provided within a designated quantity of plays of the slot game during a gaming session; (o) the player achieving a designated quantity of consecutive winning outcomes during a gaming session; (p) the player achieving a designated quantity of consecutive losing outcomes during a gaming session; (q) a total quantity of winning outcomes achieved by the player during a gaming session reaching a designated quantity; (r) a total quantity of losing outcomes achieved by the player during a gaming session reaching a designated quantity; (s) a total amount of coin-in during a gaming session reaching a designated quantity; (t) a credit balance of the player reaching a designated credit balance; (u) a total amount of currency deposited by the player during a gaming session reaching a designated amount; (v) a change in frequency of play reaching a designated amount; (w) a ticket, coupon, or promotion being inserted or otherwise entered (such as by typing in a promotion code or scanning a barcode); (x) a designated quantity of credits being transferred onto the gaming system; and/or (y) player tracking points being converted into one or more credits.

In various embodiments, the slot game is associated with a single triggering event rather than a separate triggering event associated with each group of the symbols. It should be appreciated that, in certain such embodiments, upon an occurrence of the triggering event, the gaming system provides the symbol replacement feature in association with a randomly determined (or other suitably determined) group of the symbols or sequentially for each group of the symbols.

In certain embodiments, the slot game is associated with a plurality of triggering events that are not associated with any particular group(s) of the symbols. It should be appreciated that, in certain such embodiments, upon an occurrence of the triggering event, the gaming system provides the symbol replacement feature in association with a randomly determined (or other suitably determined) group of the symbols.

In certain embodiments, each group of the symbols is associated with a plurality of different triggering events, and each such triggering event is associated with a different variation of the symbol replacement feature. Thus, in these embodiments, for a particular group of the symbols, the type of symbol replacement feature that the gaming system provides depends on which of the triggering events associated with that group of the symbols occurs. For instance, in one example embodiment, Group 1 is associated with: (a) a first triggering event that occurs when the triggering symbol included in Group 1 is displayed at at least one of the symbol display areas, and (b) a second triggering event that occurs when the triggering symbol included in Group 1 is displayed at each symbol display area of a column of symbol display areas. In this example embodiment: (a) when the first triggering event occurs, the gaming system replaces all displayed low-value symbols included in Group 1 and all displayed triggering symbols included in group 1 with the high-value symbol included in Group 1; and (b) when the second triggering event occurs, the gaming system replaces all displayed low-value symbols included in Group 1, all displayed triggering symbols included in Group 1, and all other symbols displayed at symbol display areas in the same columns as such displayed low-value symbols and triggering symbols with the high-value symbol included in Group 1. Thus, in this example embodiment, the gaming system provides progressively more valuable symbol replacement features as the triggering events become less likely to occur.

In various embodiments, upon an occurrence of a triggering event associated with a particular group of the symbols, the gaming system provides an ancillary symbol replacement feature in addition to replacing any displayed instances of (at least) a first one of the symbols in that group of the symbols with a second different one of the symbols in that particular group of the symbols. For instance, in various embodiments, the gaming system provides ancillary symbol replacement feature by: (a) replacing any symbols displayed at any symbol display areas above and in the same column as the symbol display area(s) displaying such first symbols with the second symbol, (b) replacing any symbols displayed at any symbol display areas below and in the same column as the symbol display area(s) displaying such first symbols with the second symbol, (c) replacing any symbols displayed at any symbol display areas in the same column as the symbol display area(s) displaying such first symbols with the second symbol, (d) replacing any symbols displayed at any symbol display areas to the right of and in the same row as the symbol display area(s) displaying such first symbols with the second symbol, (e) replacing any symbols displayed at any symbol display areas to the left of and in the same row as the symbol display area(s) displaying such first symbols with the second symbol, (f) replacing any symbols displayed at any symbol display areas in the same row as the symbol display area(s) displaying such first symbols with the second symbol, (g) replacing any symbols displayed at one or more randomly selected symbol display areas with the second symbol, (h) replacing any symbols displayed at one or more player-selected symbol display areas with the second symbol; (i) replacing any symbols displayed at any symbol display areas along a line extending diagonally upward and to the right of the symbol display area(s) displaying such first symbols with the second symbol; (j) replacing any symbols displayed at any symbol display areas along a line extending diagonally upward and to the left of the symbol display area(s) displaying such first symbols with the second symbol; (k) replacing any symbols displayed at any symbol display areas along a line extending diagonally downward and to the right of the symbol display area(s) displaying such first symbols with the second symbol; (l) replacing any symbols displayed at any symbol display areas along a line extending diagonally downward and to the left of the symbol display area(s) displaying such first symbols with the second symbol; (m) replacing any symbols displayed at any symbol display areas along a line extending diagonally upward and to the right of and diagonally downward and to the left of the symbol display area(s) displaying such first symbols with the second symbol; (n) replacing any symbols displayed at any symbol display areas along a line extending diagonally upward and to the left of and diagonally downward and to the right of the symbol display area(s) displaying such first symbols with the second symbol; or (o) any suitable combination thereof).

In certain embodiments including a plurality of different triggering events, one or more of the triggering events are associated with different ancillary symbol replacement feature. In one such embodiments, the rarer the triggering event, the more valuable the ancillary symbol replacement feature.

In various embodiments, the gaming system provides one or more of the ancillary symbol replacement features when the slot game is a bonus game and does not provide any such ancillary symbol replacement features when the slot game is a primary game. In other words, in these embodiments, the gaming system provides the symbol replacement feature without any ancillary symbol replacement features when the triggering event occurs during primary game play, and provides the symbol replacement feature along with one or more ancillary symbol replacement features when the triggering event occurs during bonus game play.

In certain embodiments, if the triggering event occurs, the gaming system makes a first award determination before providing the symbol replacement feature and a second award determination after providing the symbol replacement feature.

In various embodiments, at least two groups of the symbols share a same one of the symbols. For instance, in one such embodiment, at least two groups of the symbols share a Wild symbol. In other embodiments, at least two sub-sets of the symbols share a same one of the symbols. For instance, in one such embodiment, at least two sub-sets of the symbols share a Wild symbol.

It should be appreciated that the set of symbols may be categorized or included in groups in any suitable manner. For instance, in one embodiment, the gaming system includes symbols sharing a common color in the same group (e.g., Group 1 includes red symbols, Group 2 includes blue symbols, etc.). In another embodiment, the gaming system includes symbols sharing a common theme in the same group (e.g., Group 1 includes royal symbols, Group 2 includes animal symbols, and the like). In another embodiment, the gaming system includes symbols of a same size in the same group (e.g., Group 1 includes symbols of a first size, Group 2 includes symbols of a second size that is smaller than the first size, etc.). In another embodiment, the gaming system includes symbols having the same shape in the same group (e.g., Group 1 includes star-shaped symbols, Group 2 includes circular symbols, Group 3 includes triangular symbols, etc.). In another embodiment, the gaming system includes single symbols in Group 1 and double symbols in Group 2.

It should be appreciated that:

(a) the particular triggering event(s) employed;

(b) the occurrence of the triggering event;

(c) the quantity of symbol display areas for the slot game;

(d) the manner in which the symbol display areas of the slot game are arranged;

(e) how the symbols of the set of symbols are grouped;

(f) the quantity of groups of the symbols;

(g) the triggering event(s) associated with the particular groups of the symbols;

(h) the particular symbols included in each group of the symbols;

(i) the quantity of sub-sets of the symbols;

(j) the particular symbols included in the sub-sets of the symbols;

(k) which ancillary symbol replacement feature to provide (if any); and/or (l) any other variables and determinations described herein may be: (1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 5A:
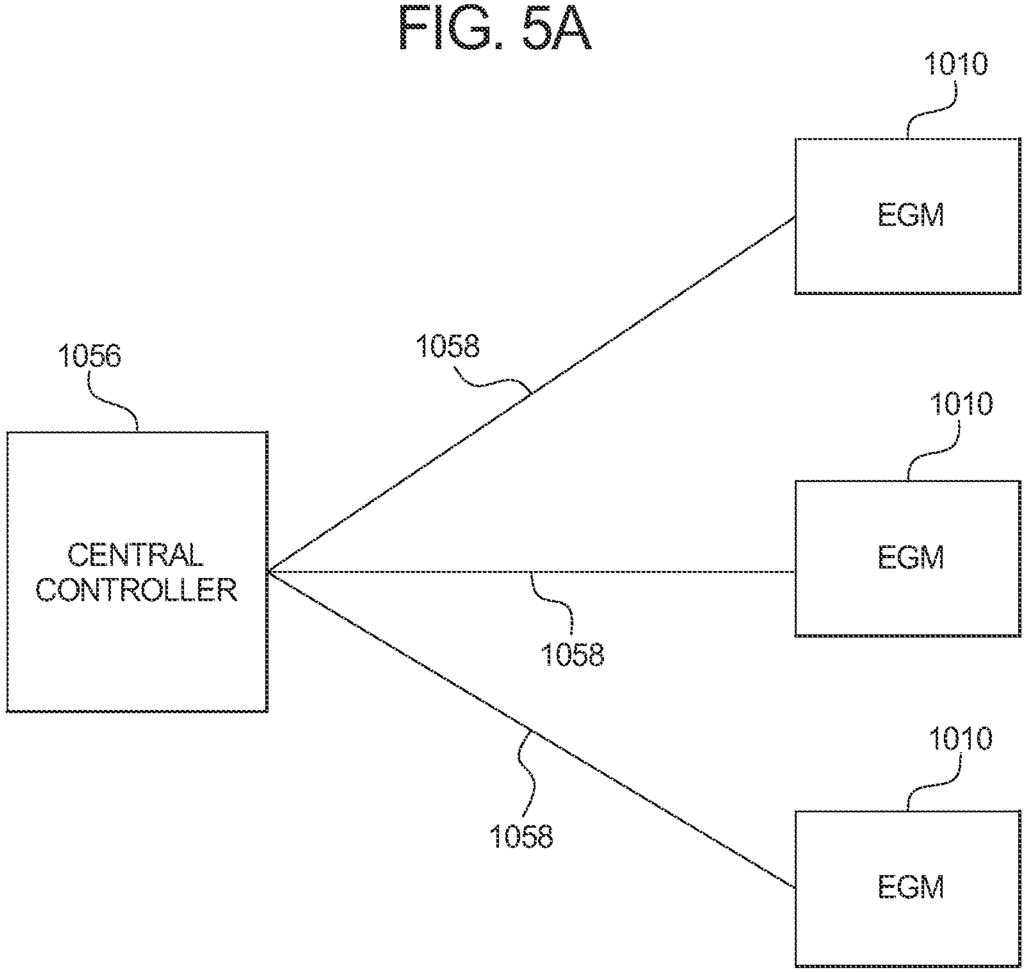
FIG. 5A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
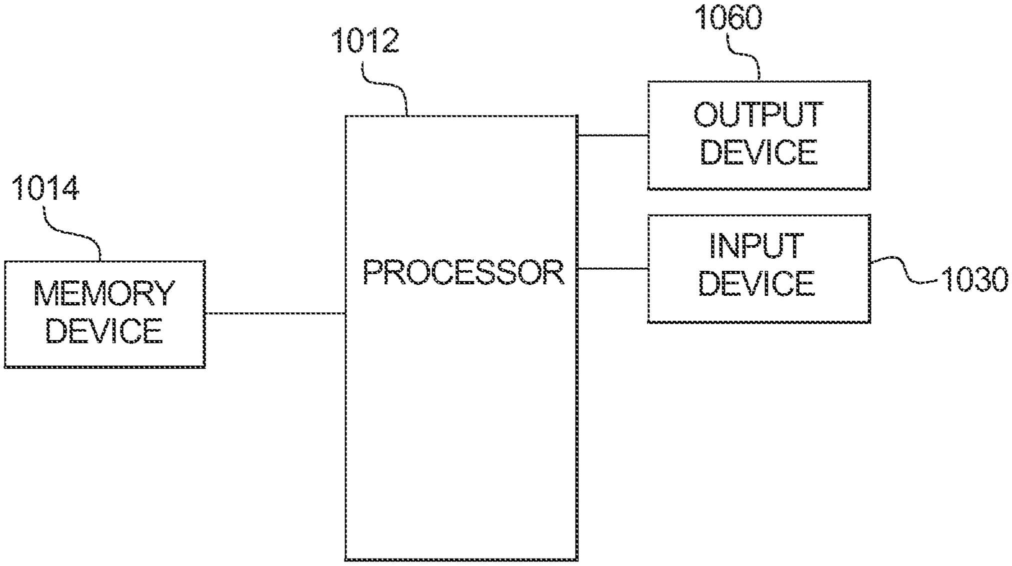
FIG. 5B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
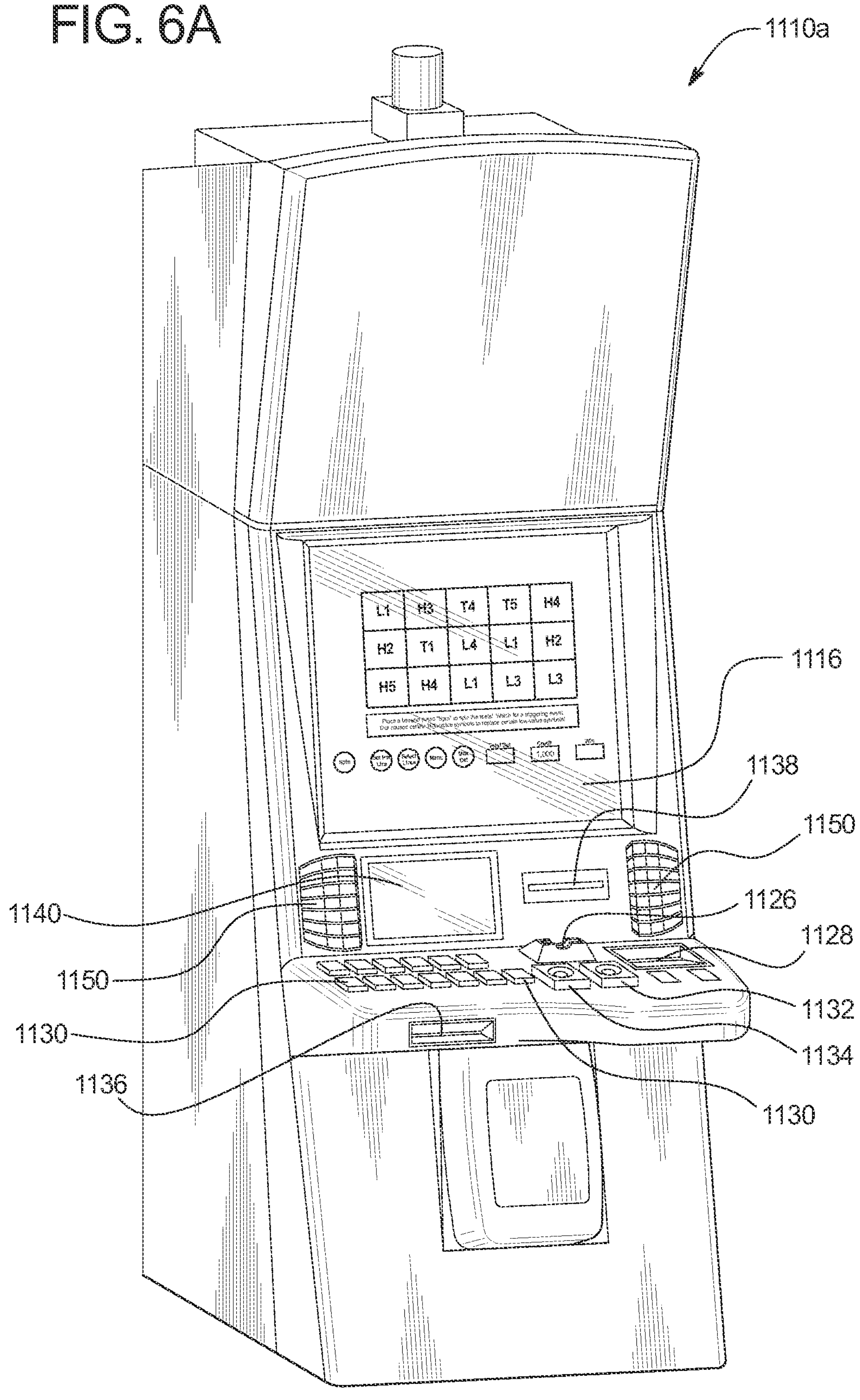
FIGS. 6A and 6B are perspective views of example alternative embodiments of the gaming system of the present disclosure.
Figure 6B:
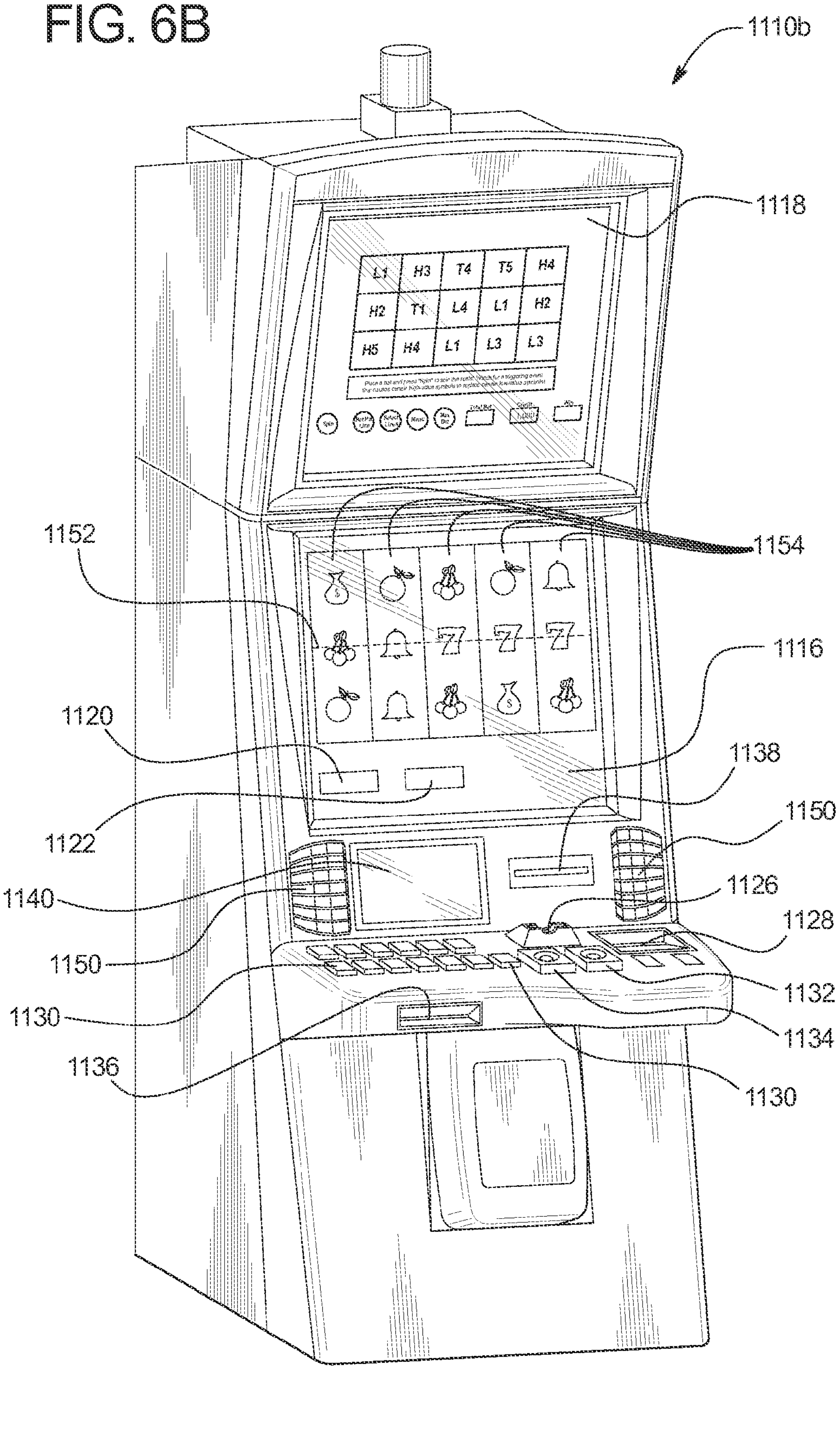

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs 1110*a* and 1110*b* that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs 1110*a* and 1110*b* illustrated in FIGS. 6A and 6B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. The example EGMs 1110*a* and 1110*b* illustrated in FIGS. 6A and 6B each include one or more input devices 1130.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs 1110*a* and 1110*b* illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 1110*a* illustrated in FIG. 6A includes a central display device 1116, a player tracking display 1140, a credit display 1120, and a bet display 1122. The example EGM 1110*b* illustrated in FIG. 6B includes a central display device 1116, an upper display device 1118, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs 1110*a* and 1110*b* illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs 1110*a* and 1110*b* illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs 1110*a* and 1110*b* illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 1110*a* and 1110*b* shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 1110*b* shown in FIG. 6B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device;

an acceptor; and at least one memory device that stores a plurality of instructions which, when executed by the at least one processor, cause the at least one processor to operate with the at least one display device, the acceptor, and the at least one input device to:

(a) establish a credit balance responsive to receipt of a physical item associated with a monetary value by the acceptor;

(b) place a wager responsive to an actuation of a wager button, the credit balance decreasable by the wager;

(c) display a plurality of symbol display areas;

(d) for each of the plurality of symbol display areas, randomly determine one of a set of a plurality of different symbols and display said randomly determined symbol at said symbol display area, wherein:

(i) for each symbol of the set of symbols, said symbol is included in one of a plurality of different groups of the symbols, and (ii) each group of the symbols includes at least two different symbols of the set of symbols;

(e) if a triggering event associated with one of the groups of the symbols occurs, for each of at least one displayed symbol in said group of the symbols, replace said displayed symbol with a different one of the symbols in said group of the symbols;

(f) determine any awards associated with the displayed symbols; and (g) display any determined awards, the credit balance increasable by any determined awards; and (h) initiate a payout associated with the credit balance responsive to an actuation of a cashout button.

2. The gaming system of claim 1, wherein each group of the symbols is associated with a different triggering event.

3. The gaming system of claim 1, wherein the set of symbols includes a plurality of subsets of the symbols, and each group of the symbols includes at least one symbol from each subset of the symbols.

4. The gaming system of claim 1, wherein a first one of the groups of the symbols includes a first symbol having a first value and a second symbol having a second value.

5. The gaming system of claim 4, wherein the plurality of instructions, when executed by the at least one processor, cause the at least one processor to operate with the at least one display device to, if a first triggering event associated with the first one of the groups occurs, for each displayed second symbol, replace said displayed second symbol with said first symbol.

6. The gaming system of claim 5, wherein the first value is higher than the second value.

7. A method of operating a gaming system, said method comprising:

(a) receiving, by an acceptor, a physical item associated with a monetary value;

(b) establishing, by at least one processor, a credit balance based at least in part on the monetary value associated with the received physical item;

(c) receiving an actuation of a wager button;

(d) placing, by the at least one processor, a wager responsive to the actuation of the wager button, the credit balance decreasable by the wager;

(e) displaying, by causing at least one processor to execute a plurality of instructions to operate with at least one display device, to display a plurality of symbol display areas;

(f) for each of the plurality of symbol display areas, causing the at least one processor to execute the plurality of instructions to randomly determining, by the at least one processor, determine one of a set of a plurality of different symbols and display said randomly determined symbol at said symbol display area, wherein: (i) for each symbol of the set of symbols, said symbol is included in one of a plurality of different groups of the symbols, and (ii) each group of the symbols includes at least two different symbols of the set of symbols;

(g) if a triggering event associated with one of the groups of the symbols occurs, for each of at least one displayed symbol in said group of the symbols, replacing, by the at least one processor, causing the at least one processor to execute the plurality of instructions to operate with the at least one display device to replace said displayed symbol with a different one of the symbols in said group of the symbols;

(h) causing the at least one processor to execute the plurality of instructions to determine determining, by the at least one processor, any awards associated with the displayed symbols; and (i) displaying, by causing the at least one processor to execute the plurality of instructions to operate with the at least one display device, to display any determined awards, the credit balance increasable by any determined awards;

(j) receiving an actuation of a cashout button; and (k) initiating, by the at least one processor, a payout associated with the credit balance responsive to the actuation of the cashout button.

8. The method of claim 7, wherein each group of the symbols is associated with a different triggering event.

9. The method of claim 7, wherein the set of symbols includes a plurality of subsets of the symbols, and each group of the symbols includes at least one symbol from each subset of the symbols.

10. The method of claim 7, wherein a first one of the groups of the symbols includes a first symbol having a first value and a second symbol having a second value.

11. The method of claim 10, which includes causing the at least one processor to execute the plurality of instructions to operate with the at least one display device to, if a first triggering event associated with the first one of the groups occurs, for each displayed second symbol, replacing, by the at least one processor, replace said displayed second symbol with said first symbol.

12. The method of claim 11, wherein the first value is higher than the second value.

13. The method of claim 7, which is provided through a data network.

14. The method of claim 13, wherein the data network is an internet.

15. A non-transitory computer readable medium that stores a plurality of instructions which, when executed by at least one processor, cause the at least one processor to:

(a) establish a credit balance responsive to receipt of a physical item associated with a monetary value by the acceptor;

(b) place a wager responsive to an actuation of a wager button, the credit balance decreasable by the wager;

(c) cause at least one display device to display a plurality of symbol display areas;

(d) for each of the plurality of symbol display areas, randomly determine one of a set of a plurality of different symbols and cause the at least one display device to display said randomly determined symbol at said symbol display area, wherein: (i) for each symbol of the set of symbols, said symbol is included in one of a plurality of different groups of the symbols, and (ii) each group of the symbols includes at least two different symbols of the set of symbols;

(e) if a triggering event associated with one of the groups of the symbols occurs, for each of at least one displayed symbol in said group of the symbols, cause the at least one display device to replace said displayed symbol with a different one of the symbols in said group of the symbols;

(f) determine any awards associated with the displayed symbols; and (g) cause the at least one display device to display any determined awards, the credit balance increasable by any determined awards; and (h) initiate a payout associated with the credit balance responsive to an actuation of a cashout button.

16. The non-transitory computer readable medium of claim 15, wherein each group of the symbols is associated with a different triggering event.

17. The non-transitory computer readable medium of claim 15, wherein the set of symbols includes a plurality of subsets of the symbols, and each group of the symbols includes at least one symbol from each subset of the symbols.

18. The non-transitory computer readable medium of claim 15, wherein a first one of the groups of the symbols includes a first symbol having a first value and a second symbol having a second value.

19. The non-transitory computer readable medium of claim 18, wherein the plurality of instructions, when executed by the at least one processor, cause the at least one processor to, if a first triggering event associated with the first one of the groups occurs, for each displayed second symbol, cause the at least one display device to replace said displayed second symbol with said first symbol.

20. The non-transitory computer readable medium of claim 19, wherein the first value is higher than the second value.

* * * * *